United States Patent [19]

Sato et al.

[11] 4,099,972
[45] Jul. 11, 1978

[54] DYE IMAGE FORMING PROCESS USING SHIFTED AZO DYE DEVELOPER

[75] Inventors: Yuzuru Sato; Ryuichiro Kobayashi, both of Hachioji; Naoshi Kunieda; Kazumasa Watanabe, both of Tokyo; Noboru Mizukura, Hachioji; Kenji Yoshida, Yokohama; Tadanori Oya, Kawasaki, all of Japan

[73] Assignees: Mitsubishi Chemical Industries Limited; Konishiroku Photo Industry Co., Ltd., both of Tokyo, Japan

[21] Appl. No.: 709,548

[22] Filed: Jul. 28, 1976

[30] Foreign Application Priority Data

Aug. 2, 1975 [JP] Japan .................................. 50-94293
Jun. 19, 1976 [JP] Japan .................................. 51-72402

[51] Int. Cl.² .................... G03C 5/54; G03C 1/40; G03C 1/10

[52] U.S. Cl. .................................. 96/29 D; 96/3; 96/77; 96/99; G03C/7/00

[58] Field of Search .................. 96/3, 29 D, 77, 99

[56] References Cited

U.S. PATENT DOCUMENTS

| 3,307,947 | 3/1967 | Idelson et al. ............ 96/29 D |
| 3,880,658 | 4/1975 | Lestina et al. ............ 96/29 D |
| 3,932,381 | 1/1976 | Haase et al. .................. 96/3 |
| 3,953,211 | 4/1976 | Imai et al. .................. 96/77 |

*Primary Examiner*—Dennis E. Talbert, Jr.
*Assistant Examiner*—Richard L. Schilling
*Attorney, Agent, or Firm*—Bierman & Bierman

[57] ABSTRACT

A process for forming a dye image on a receiving element by diffusion transfer from a photosensitive element is disclosed wherein the exposed photosensitive element is processed with an alkaline solution in the presence of a particular dye developer having at least one azo radical.

5 Claims, No Drawings

DYE IMAGE FORMING PROCESS USING SHIFTED AZO DYE DEVELOPER

The present invention relates to a dye image forming process in silver halide color photography, and more particularly to a dye image forming process utilizing a dye developer and also to a dye image forming process adapted for use in a color diffusion transfer process utilizing a dye developer.

There are already known various dye image forming processes such as represented by a color developing process utilizing a dye resulting from a color forming agent and a developing agent, or a so-called silver dye bleach process in which an azo dye is bleached in the presence of metallic silver.

Also in a different technical approach there is known a so-called color diffusion transfer process, which includes, for example, a process as disclosed in U.S. Pat. No. 2,647,049 wherein a coupler is rendered non-diffusible in the developed portion of silver halide, a process as disclosed in U.S. Pat. No. 3,087,817 wherein a dye is rendered non-diffusible at the developed portion, a process as disclosed in U.S. Pat. No. 3,443,939 utilizing a compound capable upon oxidation thereof of releasing a diffusible dye, or a process as disclosed in U.S. Pat. No. 3,443,941 wherein an imagewise distribution of a diffusible dye is formed by bonding or cleavage reaction utilizing unexposed portion of silver halide. Furthermore there is already known a so-called dye developer process in which a photosensitive element containing a compound provided with a radical capable of developing silver halide and with a dye portion (hereinafter the compound of this type is called dye developer) in combination with a silver halide photographic emulsion is subjected to an imagewise exposure and then subjected to a treatment with an alikaline processing liquid to develop silver halide in the exposed area thereby immobilizing the dye developer in said exposed area, and the dye developer in the unexposed area is transferred to an image receiving element maintained in contact with said photosensitive element thereby forming a dye image on said image receiving element. This process provides a positive image as the dye developer in the unexposed area is transferred to the image receiving element. This diffusion transfer dye developer process is advantageous in comparison with the conventional color developing process or silver dye bleach process in that the process is simpler and requires a shorter time. However, the combined use of a dye developer and a silver halide emulsion having a spectral sensitivity substantially overlapping the light absorption range of said dye developer induces a decrease in the number of photons to be absorbed by silver halide in said emulsion and this results in a loss of sensitivity thereof due to the light absorption by said dye developer itself, especially if it is incorporated in a same layer or in a separate layer located on the exposure surface of said silver halide emulsion. In order to prevent said sensitivity loss there has been proposed a so-called shift dye image diffusion transfer process utilizing a dye developer of which light absorption spectrum is temporarily shifted to the shorter wavelength side to improve the quantum efficiency at the imagewise exposure and is returned to the original position at a certain stage after the exposure. In such process the shift dye developer as explained above is required to show a sufficiently large shift of light absorption spectrum so as not to interfere with the spectral sensitivity of the silver halide emulsion, to irreversibly return to the original light absorption spectrum at a certain stage after the exposure but not to return thereto prior to the exposure, to show a desirable light absorption after such restoration of the light absorption spectrum, and to be easily dispersed into a hydrophilic colloid.

For such shift dye developer there is already known the use of an azo dye developer of which auxochromous radical for example an amine radical present in o- or p-position with respect to the azo bonding is acylated. However such already known shift dye developers with acylated amino radical do no meet the above-mentioned requirement of rapid returning to the original light absorption spectrum at a certain stage after the exposure, and, furthermore, do not necessarily satisfy the requirement for a large shift of the light absorption spectrum. For these reasons such compounds are not adequate as a shift dye developer and are not adapted, therefore, for use in the above-mentioned shift dye image diffusion transfer process.

The object of the present invention, therefore, is to provide a novel dye image forming process utilizing a novel dye developer, and more particularly to provide a novel shift dye image forming process utilizing a novel shift dye developer. Stated differently the object of the present invention is, more preferably, to provide a diffusion transfer dye image forming process utilizing a novel shift dye developer satisfactorily meeting the above-mentioned requirements, and also to provide a novel diffusion transfer dye image forming process utilizing a shifting dye developer provided with a sufficiently large spectrum shift so as not to interfere with the spectral sensitivity of the silver halide emulsion, and capable of rapidly and irreversibly returning to the original light absorption spectrum at a certain stage after the exposure but not prior thereto.

An another object of the present invention is to obtain an image of clear colors with a high sensitivity and a rapid processing by means of the above-mentioned dye image forming process.

The present inventors, as the result of various investigations on the dye image forming process, have found that the above-mentioned objects can be achieved in an image forming process of the following features. According to the present invention, the above-mentioned objects are achieved by subjecting a photographic material, after the imagewise exposure thereof, to a treatment with an alkaline processing liquid in the presence of an azo developer, preferably monoazo or disazo dye developer having at least one of silver halide developing radicals or the radicals of the precursors thereof, the azo dye developer at least one amino radical substituted with both the residue of an aromatic compound and an acyl radical and thereby forming a dye image corresponding to said imagewise exposure.

The azo dye developer preferably further comprises three or more of hydroxyl and/or acyloxyl groups.

The dye developer to be employed in the present invention satisfies the requirements to achieve the abovementioned objects and is a compound comprising a dye portion and provided in the molecule thereof with a radical capable of developing silver halide and or the resical of the precursor thereof, which compound contains at least one amino radical substituted with the residue of an aromatic compound and an acyl radical. Said residue of an aromatic compound may be an aromatic hydrocarbon radical such as substituted or unsubstituted phenyl or naphthyl, or an aromatic heterocyclic radical such as substituted or unsubstituted pyridyl, pyrimidyl, furyl or thienyl, and is preferably a substituted or unsubstituted phenyl radical. Also typical examples of said acyl radical are acetyl, chloroacetyl, dichloroacetyl, trichloroacetyl, bromoacetyl, dibromoacetyl, tribromoacetyl, trifluoroacetyl, methoxyacetyl, isopropoxyacetyl, hydroxyacetyl, phenylacetyl, phenoxyacetyl, propionyl, α-bromopropionyl, pentafluoropropionyl, α-phenoxypropionyl, β-phenoxypropionyl, butyryl, isobutyryl, α-bromoisobutyryl, n-valeryl, isovaleryl, heptanoyl, chrotonoyl, cinnamoyl, ethoxycarbonyl, phenoxycarbonyl, p-chlorophenoxycarbonyl, ethoxalyl etc., but is preferably an acyl radical containing not more than 8 carbon atoms, more preferably not more than 4 carbon atoms, substituted with halogen or alkoxyl. Preferred acyl radicals are represented by the formula —$COY_o$ wherein $Y_o$ is alkyl of 1 to 5 carbon atoms, having a halogen or halogens in the α- and/or β-positions of the alkyl, or —$OZ_o$ or

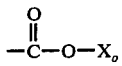

in which $Z_o$ is substituted or unsubstituted alkyl of 1 to 5 carbon atoms or substituted or unsubstituted phenyl, and $X_o$ is hydrogen or a substituent as defined for $Z_o$. Substituted alkyl in each of $X_o$ and $Z_o$ is preferably alkylsulfonyl, amido, hydroxy, carboxyl, alkoxy or hydrogen, the alkylsulfonyl being more preferably of 1 to 5 carbon atoms. Substituent or substituents for the substituted phenyl are preferably halogen, nitro, cyano, trifluoromethyl, methyl. More preferably the substituted phenyl has 1 to 3 substituents on the phenyl nucleus. Typical examples for —$OZ_o$ or

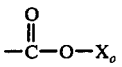

are ethoxy, β-methylsulfonylthoxy, phenoxy, β-chlorophenyloxy, ethoxycarbonyl and carboxyl. Among the substituents for —COY is preferred as of trifulorometh y.

The amino radical substituted with both the above-mentioned residue of an aromatic compound and the acyl radical is bonded to an azo compound. The monoazo or disazo compound herein employed means a compound having one or two azo radicals to which there is bonded such body groups as an aromatic hydrocarbon or aromatic heterocyclic radical, which radical is not capable of coupling reaction, or a coupler residue. Those aromatic hydrocarbon or aromatic heterocyclic radical or coupler residue are such as substituted or unsubstituted phenyl, naphthyl, pyridyl, pyrimidyl, furyl, thienyl etc.. Said coupler residue is of various couplers capable of forming an azo dye, for example, active methylene compounds or active methyne compounds such as phenols, naphthols, anilines, naphthylamines, diphenylamines, minoalkylanilines, dialkylanilines etc.. Representative examples of said active methylene or active methyne compounds are cyclic compounds such as pyrazolones, pyrazolobenzimidazoles, 2,4-dihydroxyquinolines, pyrimidazolones, methylindoles, N-ethyloxyindoles, N-phenyl-β-anilinoglutaconimides, 3-phenylisooxazole-5-ones, thioindoxyls, coumalane-3-ones, 2,4-dioxocoumalones, 1-acyl-3-oxoindolines, N-acylthiazolydines, 1,3-indanediones or open-chain compounds such as benzoylacetanilides, 2-(2'-cyanoacetyl)-coumalones, pivaloylacetanilides, p-nitrophenylacetate esters, α-cyanoacetophenones etc..

Preferably one of the body groups bonded through the azo radical or radicals is of the residue of an aromatic compound, typical examples of which can be as explained in the aforesaid residue of an aromatic compound attached to the amino radical, an aromatic hydrocarbon radical such as substituted or unsubstituted phenyl or naphthyl radical or an aromatic heterocyclic radical such as substituted or unsubstituted pyridyl, pyrimidyl, furyl or thienyl radical, but for the purpose of the present invention particularly preferred is substituted or unsubstituted phenyl or naphthyl radical.

The amino radical substituted with both the above-mentioned residue of an aromatic compound and acyl radical is bonded to said residue attached to the azo radical of an aromatic compound.

Said amino radical is bonded to the residue of an aromatic radical bonded to the azo radical preferably in such a position that performs an auxochromic effect to the azo radical. For example, if said aromatic radical is phenyl, a particularly preferable result is obtained in the present invention by placing the amino radical on phenyl in the o- or p-position, particularly o-position thereof, with respect to the azo radical. Said monoazo or disazo dye developer can contain 1 to 4 such amino radicals, preferably 1 to 2 amino radicals, in a molecule.

In the present invention the dye portion of the dye developer is said monoazo or disazo compound provided with at least one amino radical substituted with the aromatic radical and the acyl radical. Said dye portion may be provided with an additional substituent such as an alkyl, aryl, alkoxy, aryloxy, halogen, nitro, cyano, acylamino, alkylamino, acyl, acyloxy, aralkyl, hydroxyl, amino, carbamoyl, sulfamoyl, arylamino etc.

The radical capable of developing silver halide is a silver halide developing radical provided with at least two hydroxyl radicals and is such as o-dihydroxyphenyl, p-dihydroxyphenyl, 2,3,4-trihydroxyphenyl or the halogen or alkyl substituted radical thereof. For the purpose of the present invention particularly preferred is an unsubstituted or halogen- or alkyl-substituted p-dihydroxyphenyl radical. The precursor of a silver halide developing radical is a radical which is temporarily incapable of performing the developing ability but is capable of restoring such ability upon reaction with the alkaline processing liquid, and is such as the above-mentioned silver halide developing radical in which the hydroxy radicals are acylated. Said acylation of hydroxyl radicals includes acetylation, trifluoroacetylation, butyrylation, formylation, ethoxycarbonylation etc.

The above-mentioned silver halide developing radical or the precursor thereof is bonded to said dye portion, either directly or through a bonding radical not affecting the function of said developing radical and dye portion, in an optional position other than the acyl radical connected to the amino radical. For said bonding radical there may be employed various divalent radicals for example —CO—, —N(alkyl)—, —NH—, —S—, —O—, —$SO_2$—, an alkylene radical, an arylene radical, a divalent alicyclic radical, a divalent heterocyclic radical or a divalent radical obtained by the combinations thereof. The monoazo or disazo dye developer can contain 1 to 4, preferably 1 to 2 silver halide developing radicals or the precursors thereof.

In order to obtain higher sensitivity and more maximum density of a dye image transferred, the azo dye developer, preferably a monoazo or disazo dye developer, of the present invention preferably further comprises three or more of hydroxy and/or acyloxy groups. More preferably, the azo developer comprises at least one aromatic hydrocarbon and/or aromatic heterocyclic radical having and three or more, preferably less than 10, more preferably less than 6, of the hydroxy and/or acyloxy groups in the whole molecule of the azo developer. It is also preferred that the at least one aromatic radical is aryl. In this case, it may be understood that the present monoazo or disazo dye developer comprising such aryl is such a dye developer as capable of satisfying the following prerequisites, that the dye developer comprises the aryl (i) where the residue of an aromatic compound which is substituted together with an acyl group on the aforesaid amino group, is an aromatic hydrocarbon group, (ii) where the aromatic hydrocarbon group present is directly bonded to the azo-bond, (iii) where a body nucleus of the aforesaid group having a silver halide-developing function is an aromatic hydrocarbon group, or (iv) where one or more hydrogen atoms of the aforesaid dye portion have been substituted by aromatic hydrocarbon groups; or where a combination is present, said combination optionally comprising 2 to 4 prerequisites out of (i) through (iv). Typical examples of such aryl are phenyl and naphthyl.

It is a matter of importance in this case that the novel dye developer of the invention contains in the molecule as a whole a total of three or more hydroxyl and/or acyloxy groups in the whole or part of the aforesaid one or more aromatic hydrocarbon groups. This means that a sum of the numbers of the hydroxyl and acyloxy groups is three or more, and may include not only the case where all hydroxyl and/or acyloxy groups are bonded to one aromatic hydrocarbon group in the molecule but also the case where the three or more hydroxyl and/or acyloxy groups are bonded to two or more aromatic hydrocarbon groups. Also there may be included any of the cases where only the hydroxyl groups are present, the number of which is three or more, where both the acyloxy and hydroxyl groups are present, the sum of numbers of which is three or more, and where only acyloxy groups are present, the number of which is three or more.

Of such the dye developers which contain three or more hydroxyl and/or acyloxy groups in the aforesaid one or two or more aromatic hydrocarbon groups, those which show more preferable effects are such dye developers as having 2 or 3 hydroxyl or acyloxy groups, most preferably hydroxyl groups, on the aromatic hydrocarbon group of the aforesaid (iii) and 1 to 3, most preferably 1 or 2, hydroxyl or acyloxy groups on the aromatic hydrocarbon group of the aforesaid (i); (ii); (iv); (i) and (ii); (i) and (iv); (ii) and (iv); or (i), (ii) and (iv).

As representatives of the aforesaid acyloxy group, there may be mentioned such groups as acetoxy, chloroacetoxy, dichloroacetoxy, trichloroacetoxy, bromoacetoxy, dibromoacetoxy, tribormoacetoxy, mono-, di- or trifluoroacetoxy, chlorofluoroacetoxy, methoxyacetoxy, isopropoxyacetoxy, hydroxyacetoxy, phenylacetoxy, phenoxyacetoxy, propionylacetoxy, α-bromopropionyloxy, pentafluoropropionyloxy, α-phenoxypropionyloxy, β-phenoxypropionyloxy, butyryloxy, isobutylyloxy, α-bromoisobutyryloxy, valeryloxy, isovaleryloxy, heptanoyloxy, crotonoyloxy, cinnamoyloxy, ethoxycarbonyloxy, phenoxycarbonyloxy, p-chlorophenoxycarbonyloxy, ethoxalyl, β-sulfonylethoxycarbonyloxy and hydroxyoxalyl. Preferable acyloxy groups are those having 8 or less carbon atoms, more preferable are those having 4 or less carbon atoms and having being substituted by halogen atom or an alkoxy group.

Having described the monoazo or disazo dye developers of the present invention with reference to their molecular structure, those which indicate the highest effect, among such the dye developers among those of the invention, are such as being represented by the following general formula.

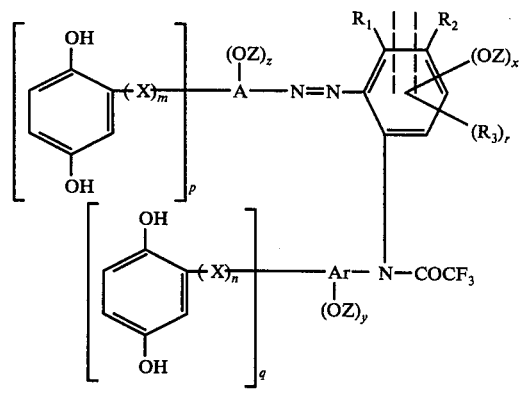

wherein A represents substituted or unsubstituted aromatic hydrocarbon, aromatic heterocyclic, or active methylene or active methine containing compound-residue which can have at least substituent selected from alkyl, aromatic hydrocarbon, alkoxy, aryloxy, halogen, nitro, cyano, acylamino, alkylamino, amyl, acyloxy, aralkyl, hydroxyl, amino, carbamoyl, sulfamoyl, and arylamino; Ar represents aromatic hydrocarbon optionally having at least one substituent selected from the same substituent group in said A; $R_1$, $R_2$, and $R_3$ individually represent hydrogen, halogen, nitro, alkyl, halogen-substituted alkyl, alkyloxy, aryloxy, alkylamide, arylamide, carbamoyl or sulfamoyl, more preferably trifluoromethyl, chloromethyl, methylamide, phenylamide, chlorine atom, bromine atom, carbamoyl or sulfamoyl, and $R_1$ and $R_2$ can co-operatively form a naphthalene nucleus and, in that case, $R_3$ is bonded to any position of the naphthalene nucleus; Y represents —CO—, —N(alkyl)—, —NH—, —S—, —O—, —$SO_2$—, alkylene, allylene, divalent alicyclic or divalent heterocyclic group or divalent organic group having a combination thereof; Z represents hydrogen or acyl; $m$ and $n$ are individually a value of 0 or 1; $p$ and $q$ are individually a value of 0 or 1, but the sum of $p$ and $q$ is 1 or more; $r$ is an integer of 1 to 5; and $x$, $y$ and $z$ are individually a value of 0, 1 or 2, provided that when A is aromatic hydrocarbon, $x+y+z$ is 1 or 2 and when A is other than aromatic hydrocarbon, $x+y$ is 1 or 2.

In the following there will be given representative examples of the dye developer of the present invention, but it is to be understood that the present invention is by no means limited to said examples.

Compound examples
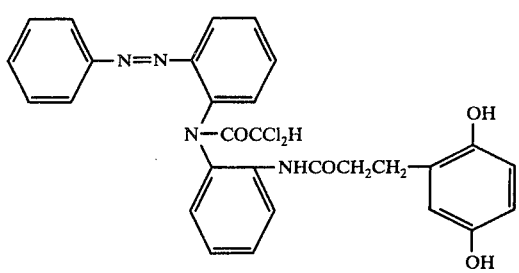
(1)
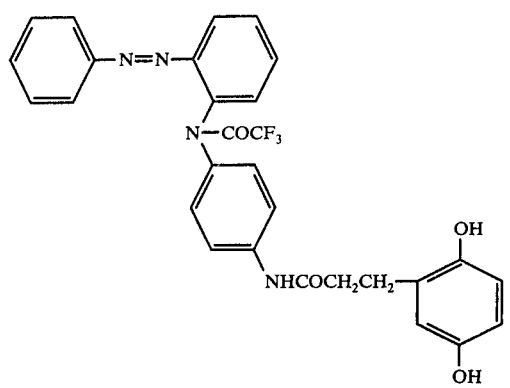
(2)
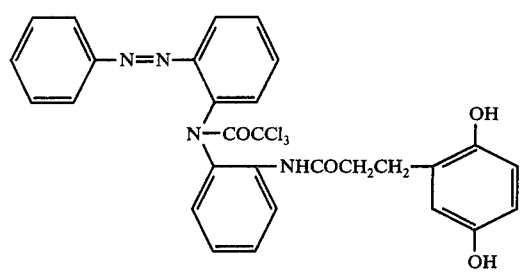
(3)
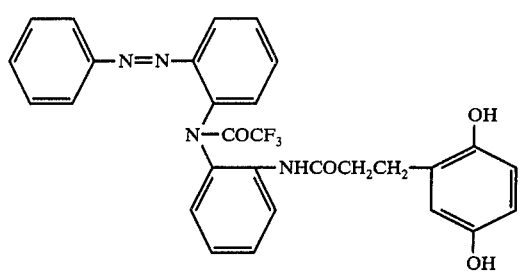
(4)
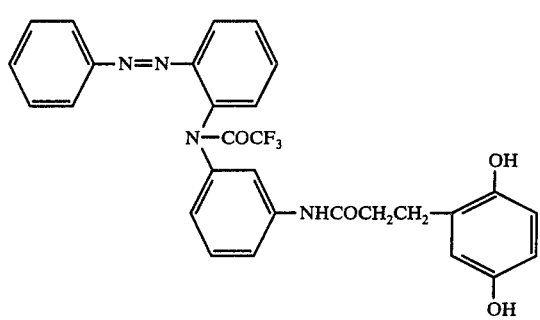
(5)

-continued
Compound examples
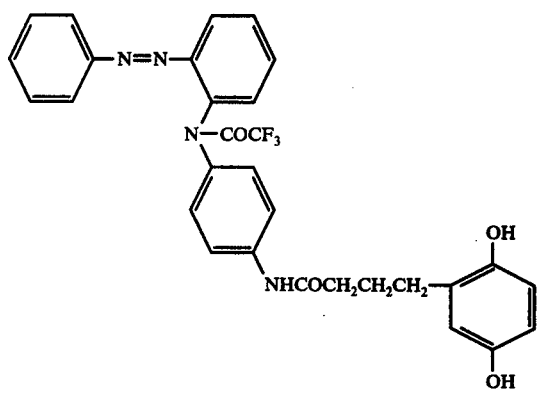 (6)
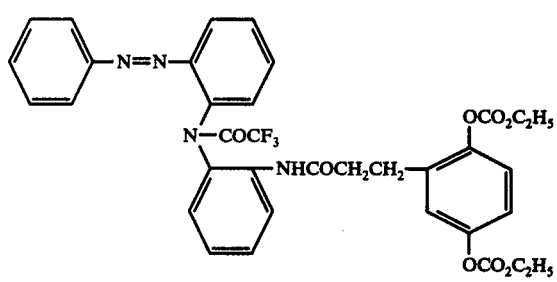 (7)
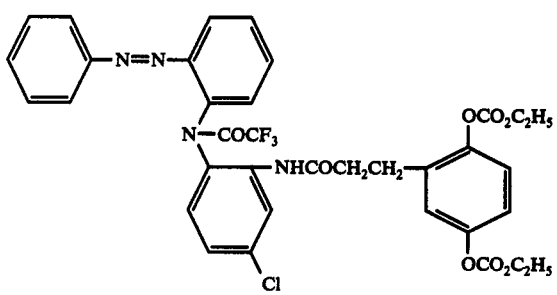 (8)
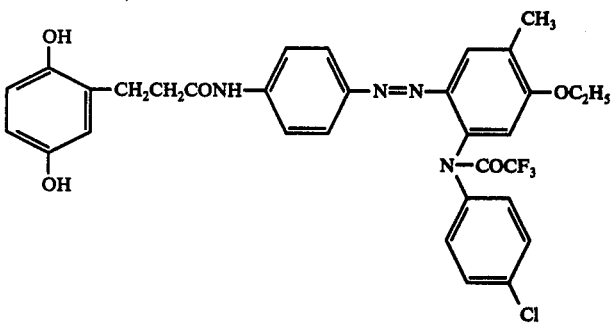 (9)
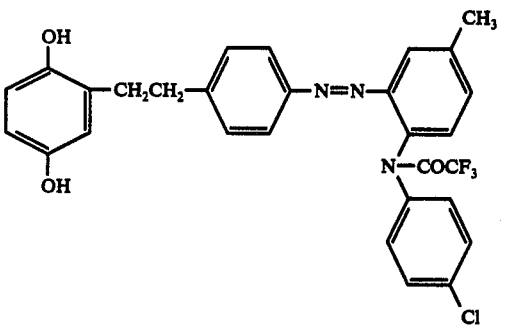 (10)

-continued
Compound examples
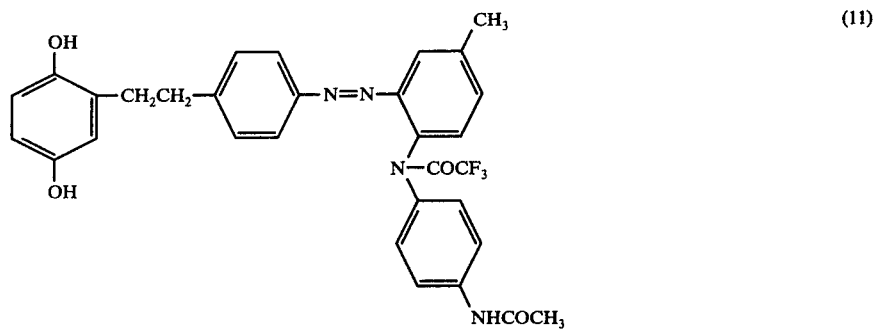
(11)
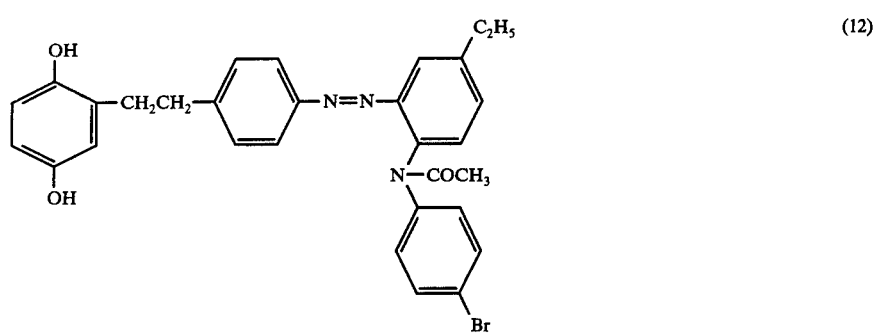
(12)
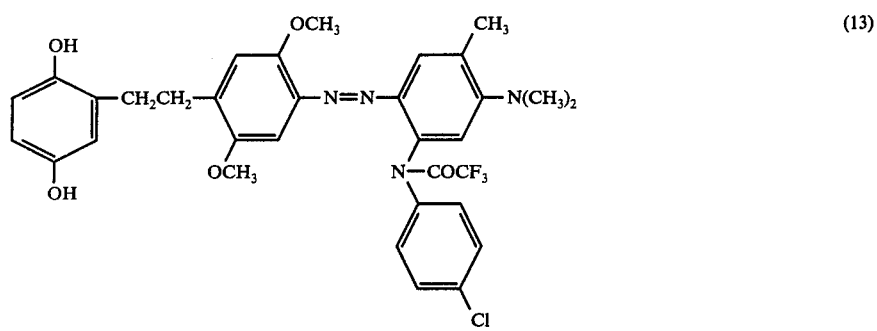
(13)
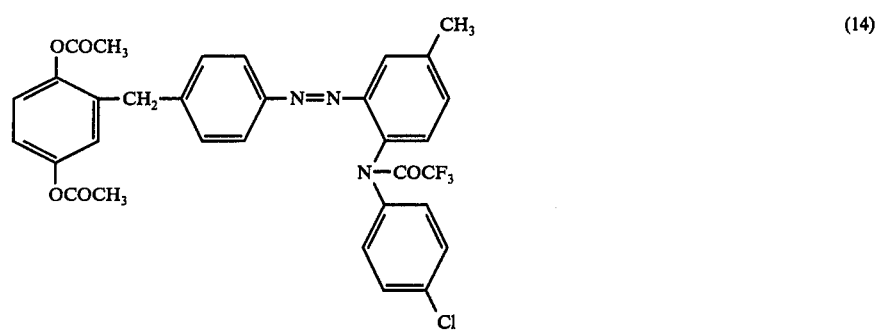
(14)

-continued
Compound examples
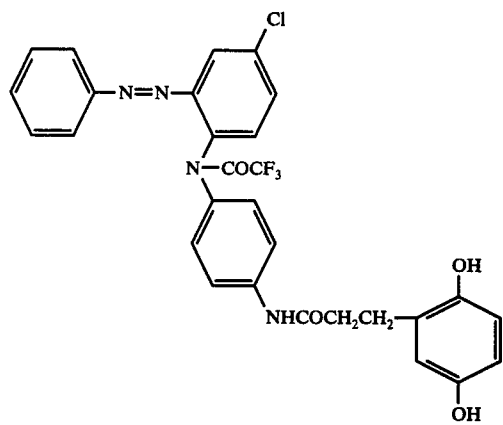 (15)
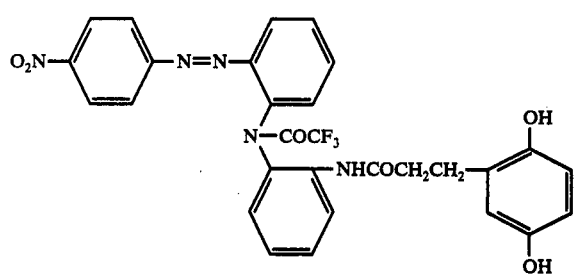 (16)
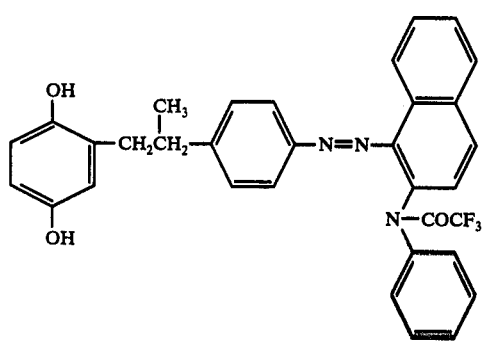 (17)
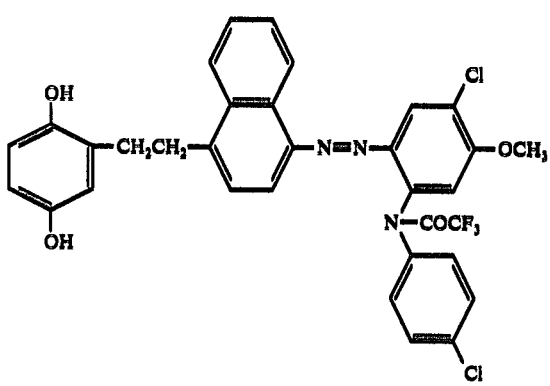 (18)

-continued
Compound examples
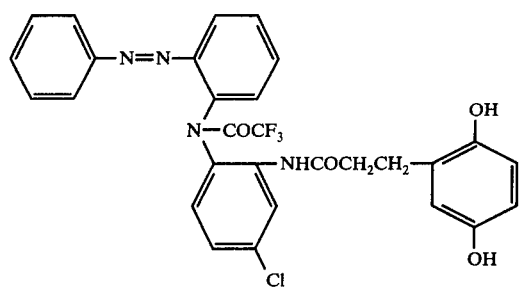
(19)
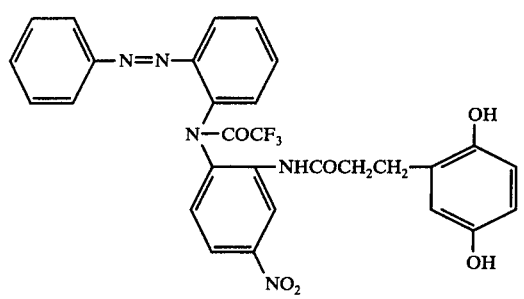
(20)
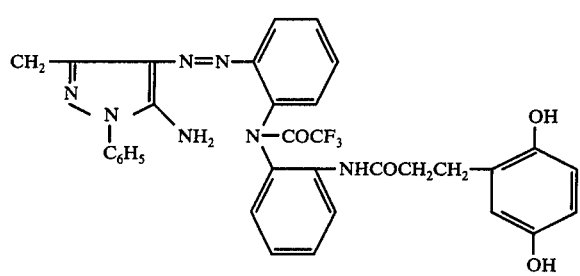
(21)
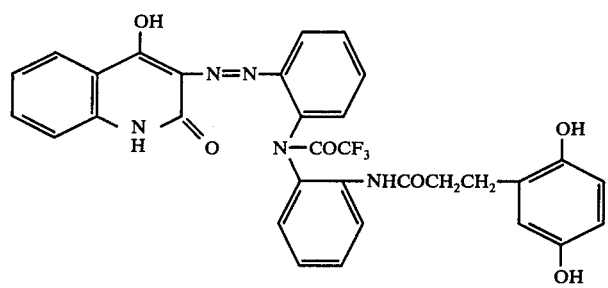
(22)
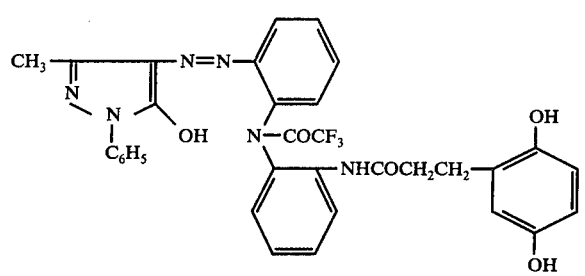
(23)

-continued
Compound examples
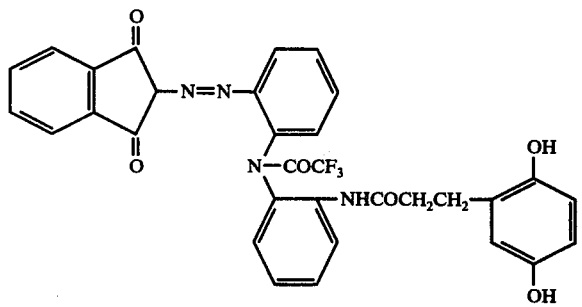
(24)
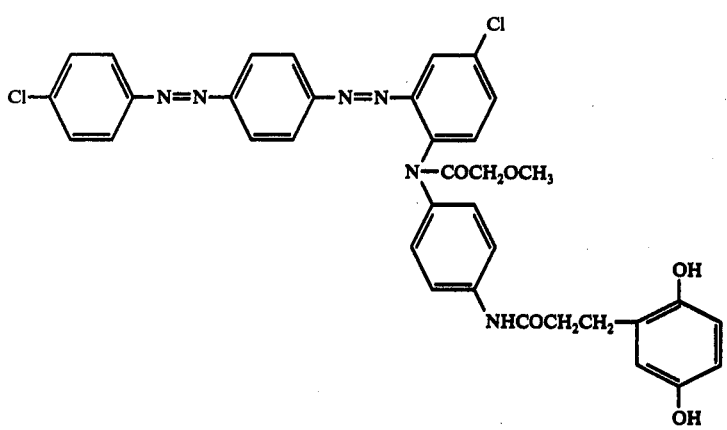
(25)
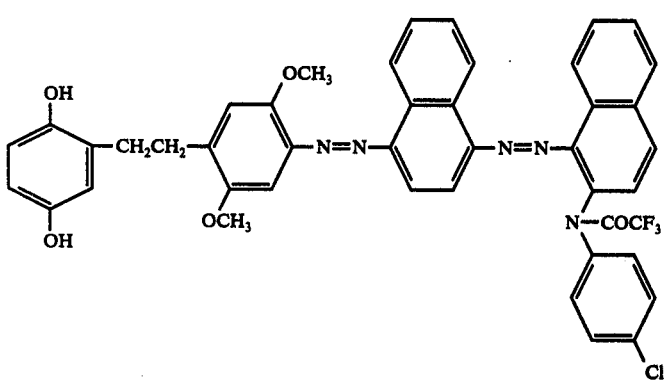
(26)
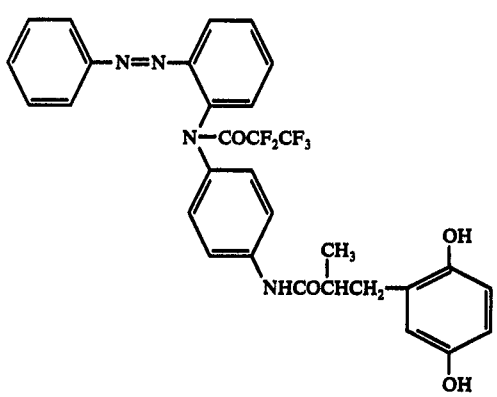
(27)

-continued
Compound examples
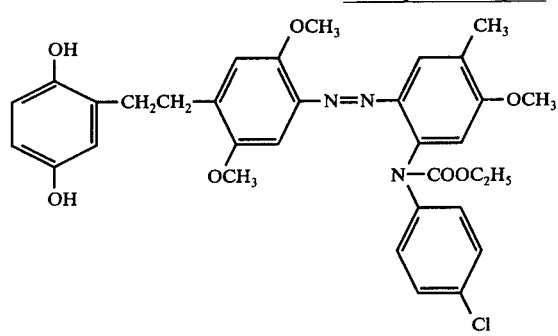 (28)
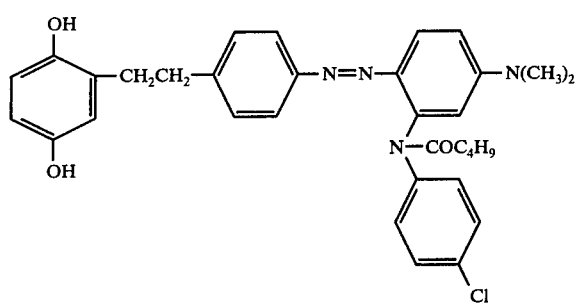 (29)
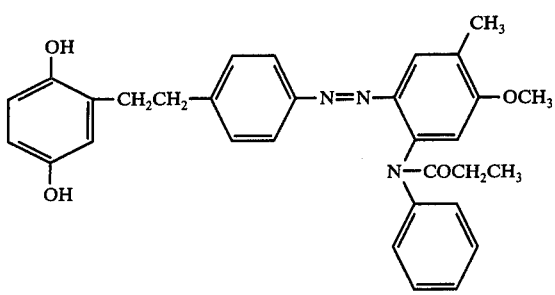 (30)
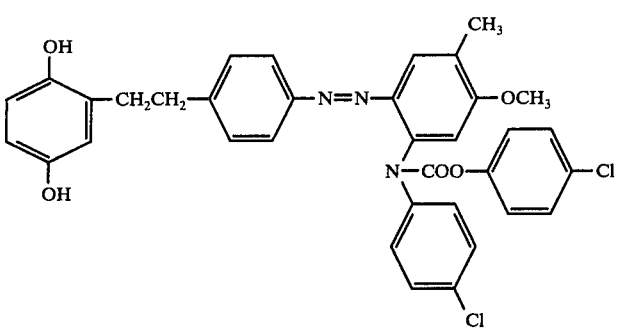 (31)
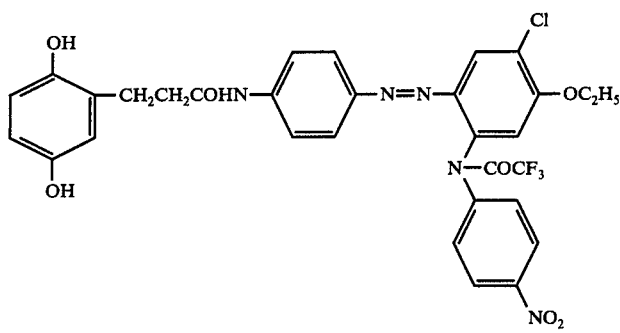 (32)

-continued
Compound examples
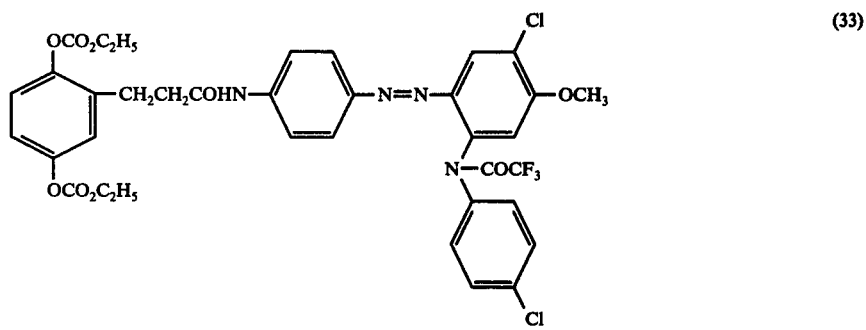
(33)
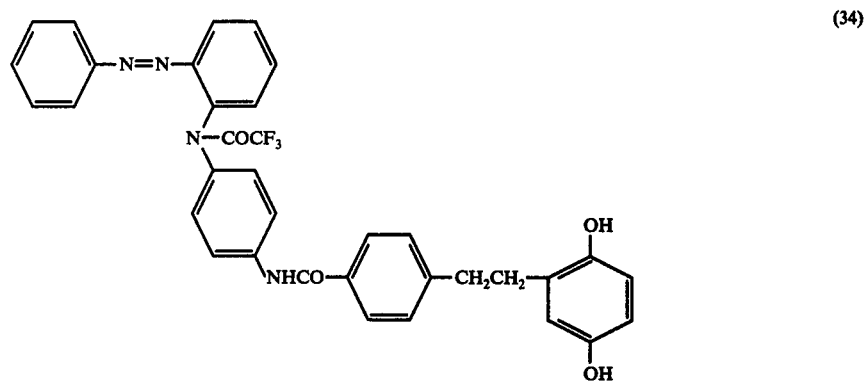
(34)
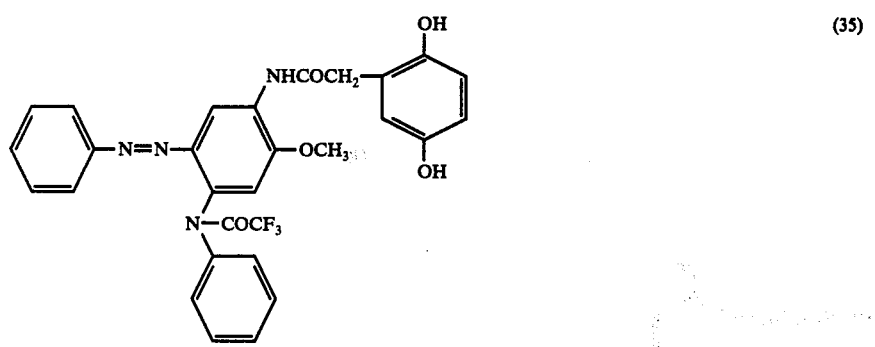
(35)
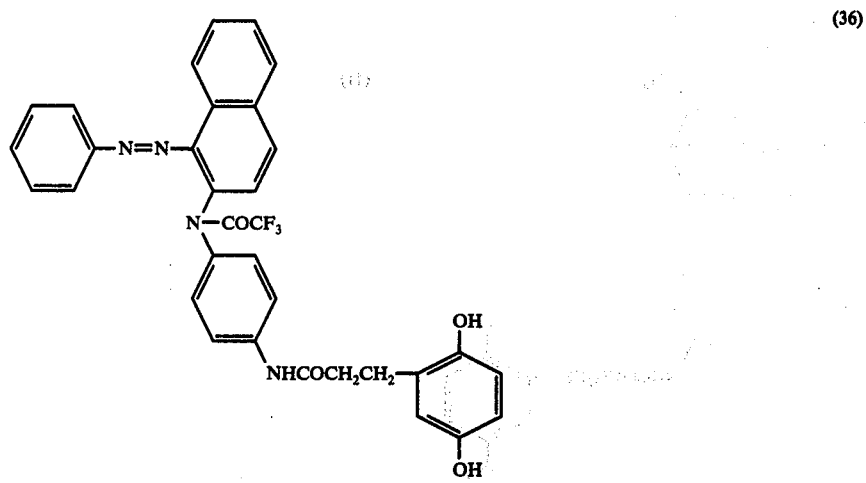
(36)

-continued
Compound examples
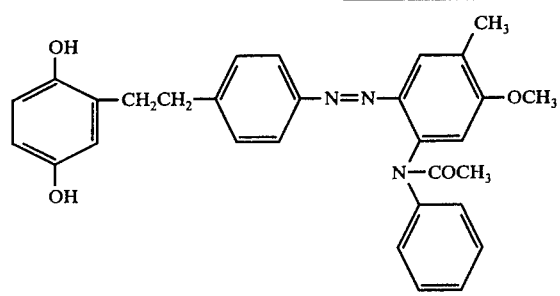 (37)
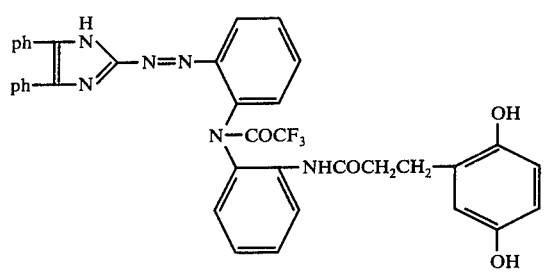 (38)
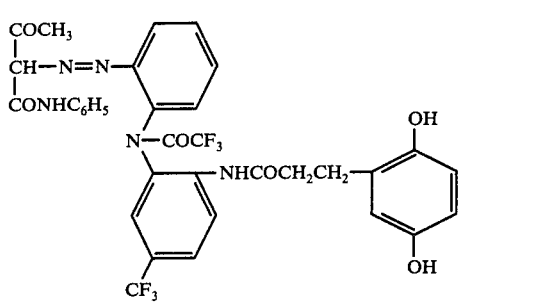 (39)
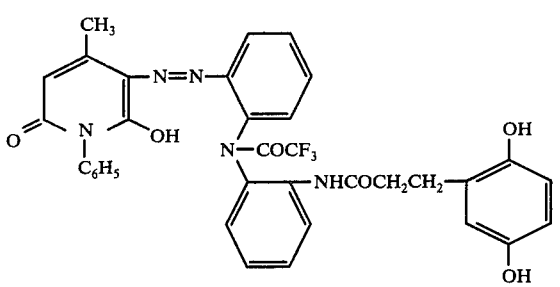 (40)
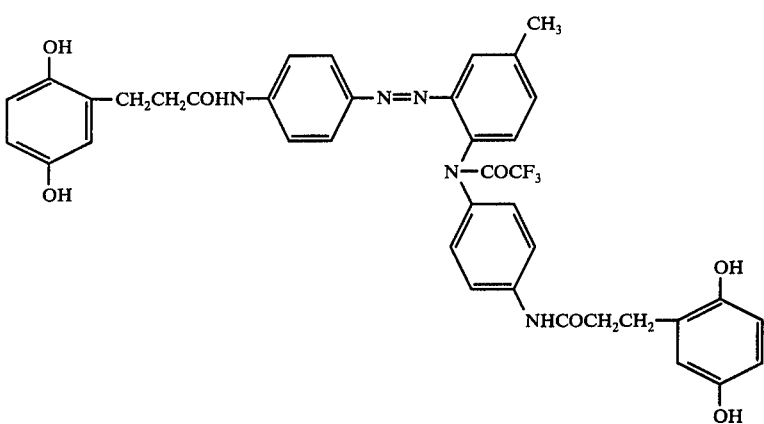 (41)

-continued
Compound examples
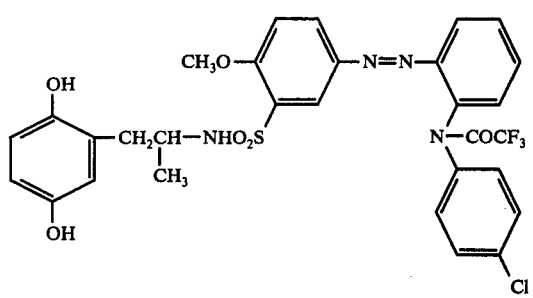
(42)
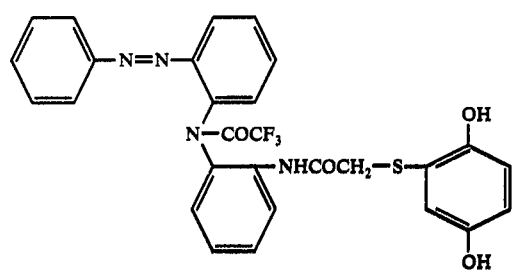
(43)
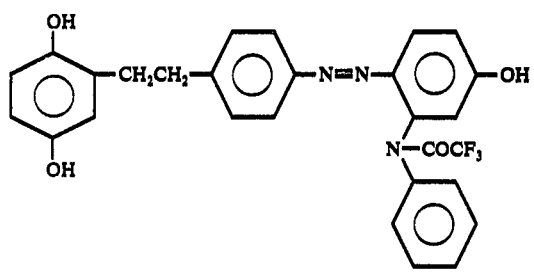
(44)
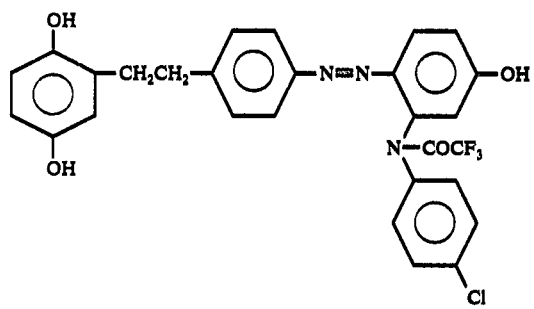
(45)
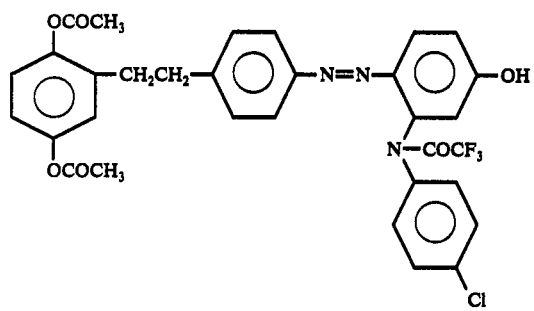
(46)

-continued
Compound examples
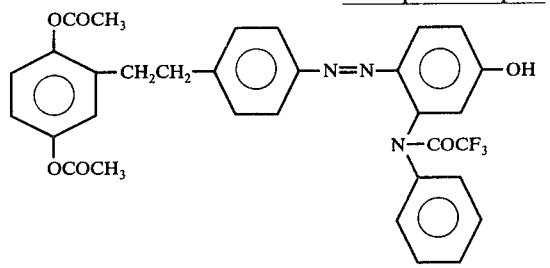 (47)
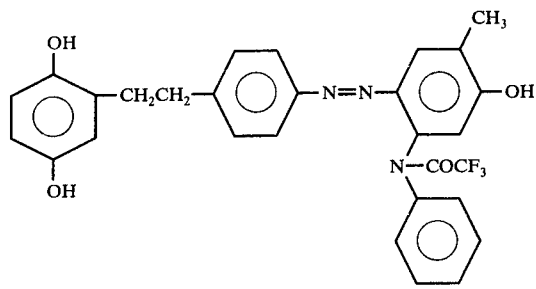 (48)
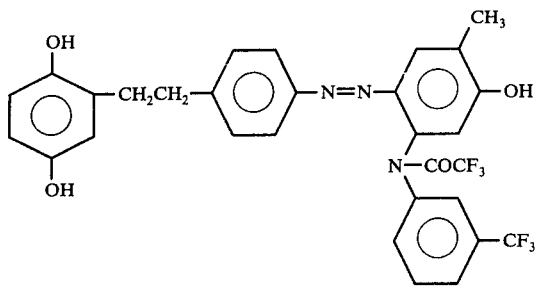 (49)
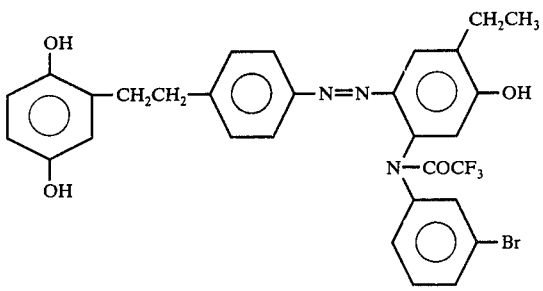 (50)
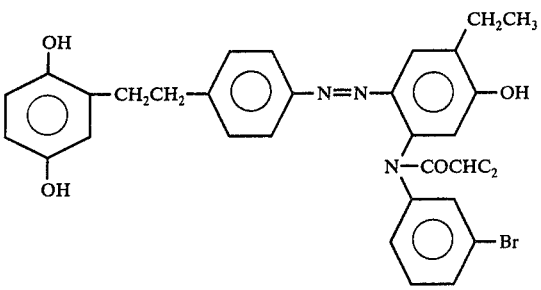 (51)
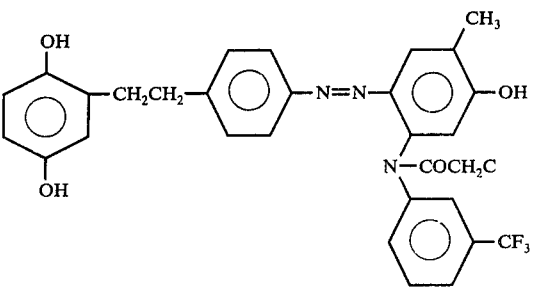 (52)

-continued
Compound examples
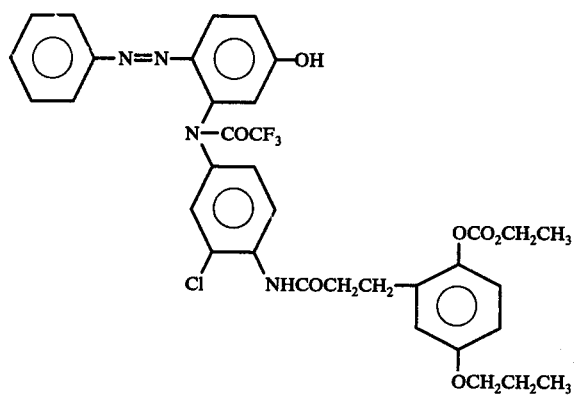 (53)
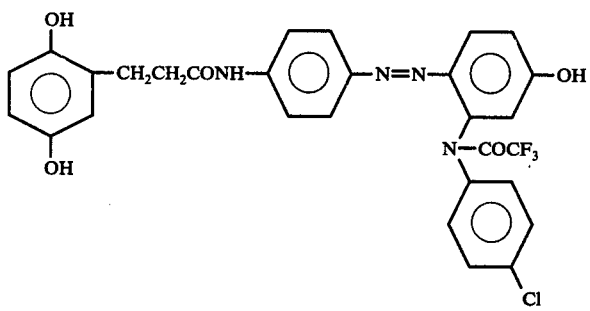 (54)
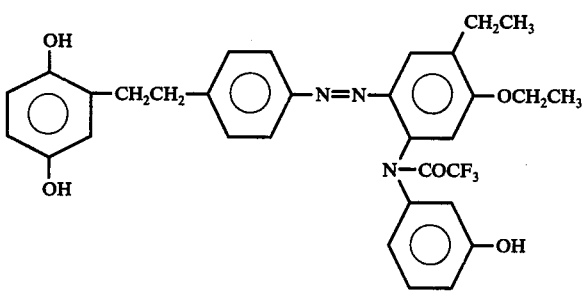 (55)
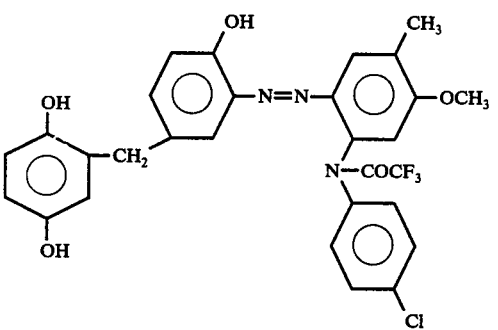 (56)
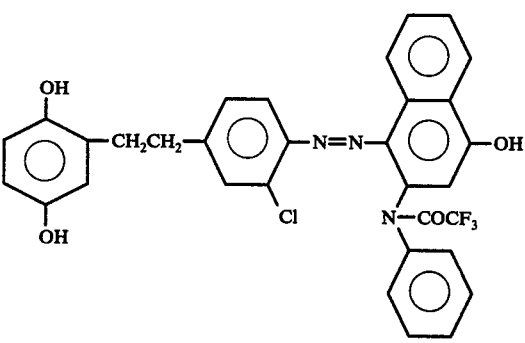 (57)

-continued
Compound examples
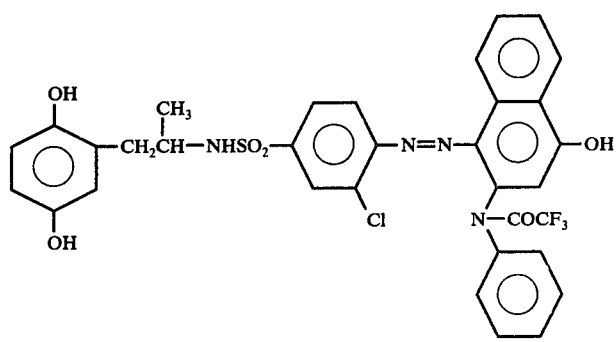
(58)
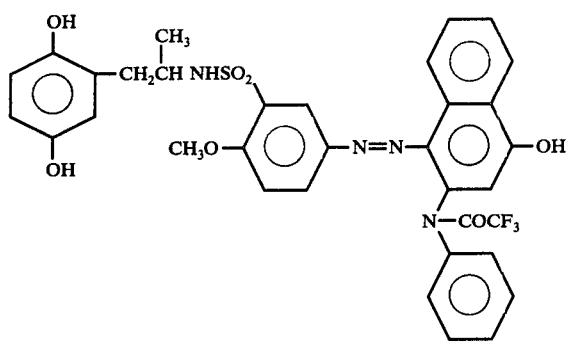
(59)
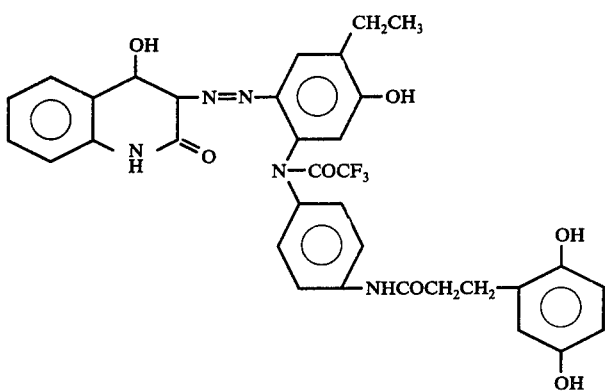
(60)
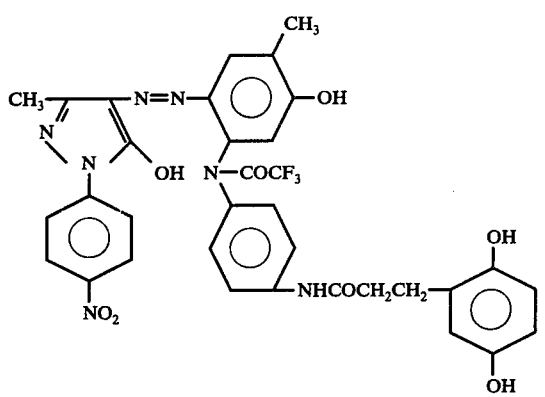
(61)

-continued
Compound examples
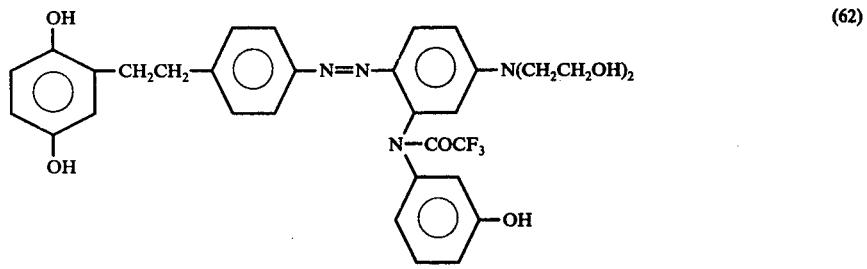
(62)
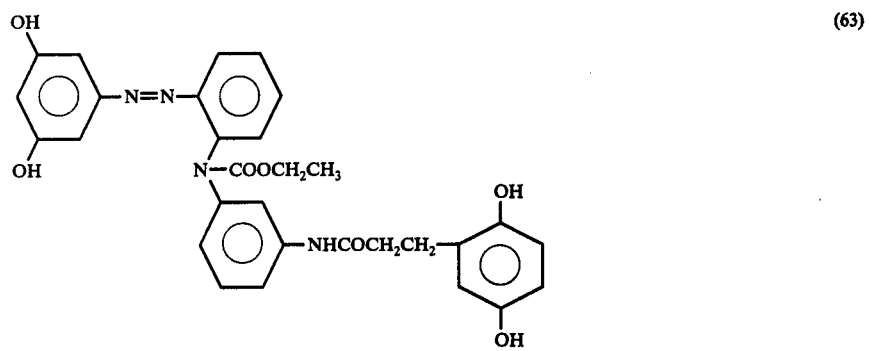
(63)
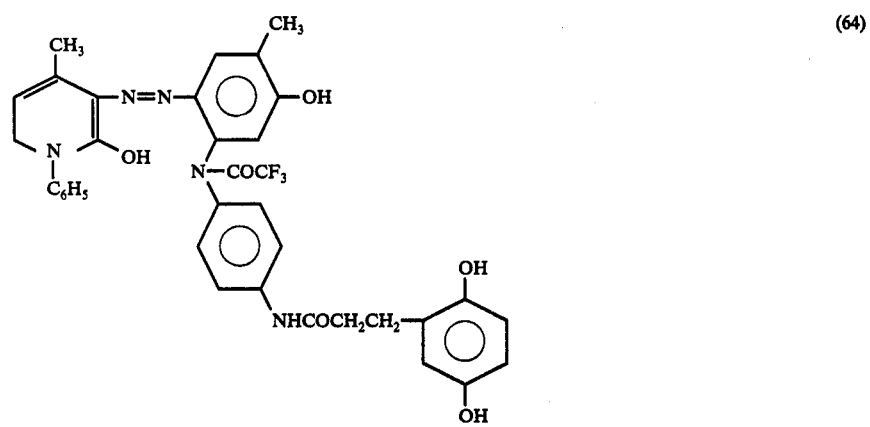
(64)
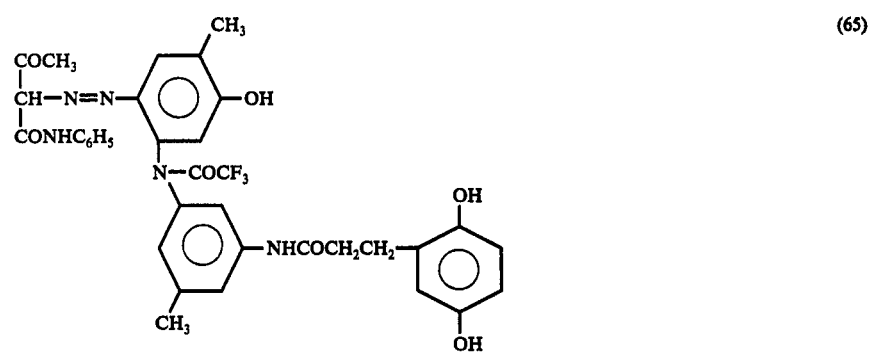
(65)

-continued
Compound examples
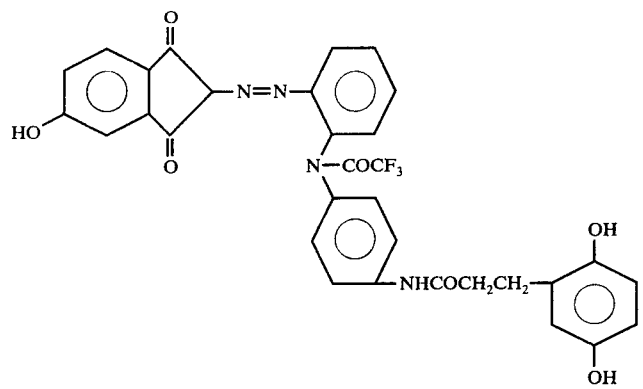
(66)
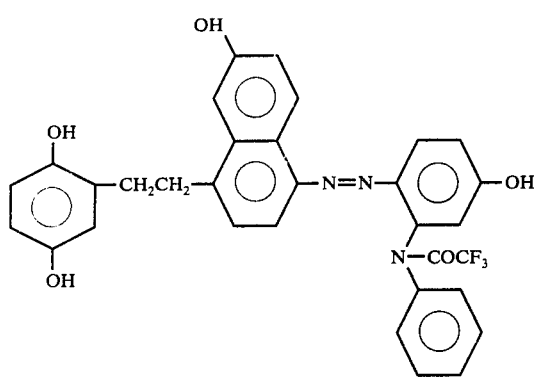
(67)
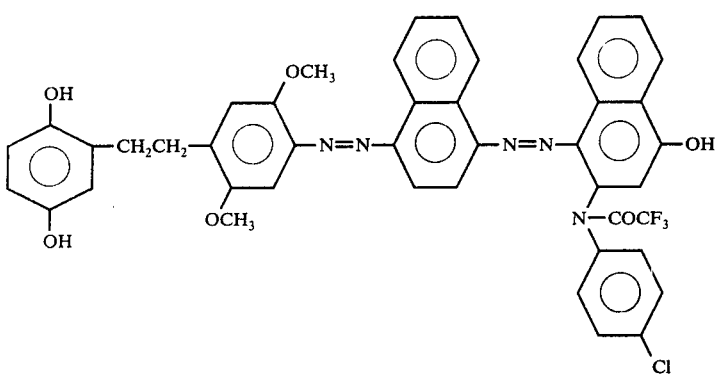
(68)
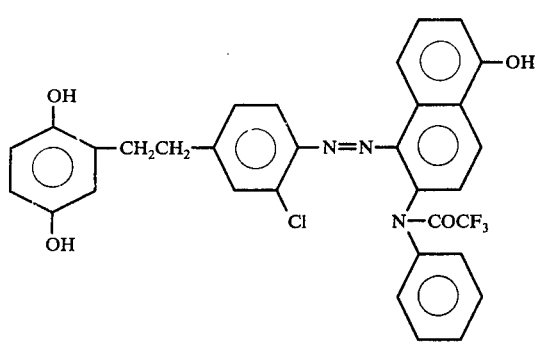
(69)

Compound examples

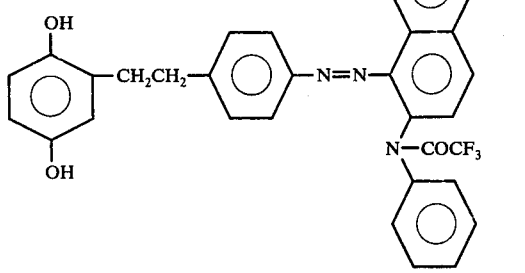
(70)

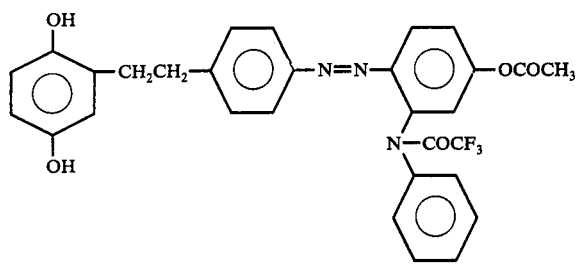
(71)

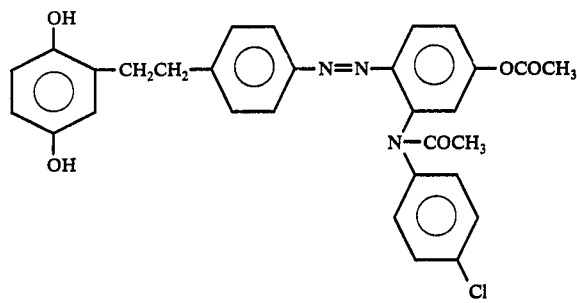
(72)

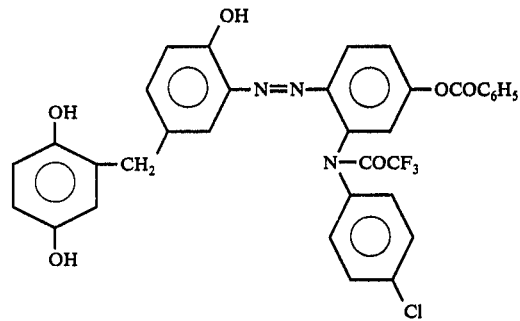
(73)

The dye developer to be employed in the present invention is synthesized in the following manner.

In the first place an aminoazo or acylaminoazo compound respectively provided with an amino or acylamino radical on the residue of an aromatic compound bonded to an azo radical is treated with a halogenated aromatic compound to introduce another residue of an aromatic compound to said amino or acylamino radical. Ahlanaively, an azo compound provided with an amino radical substituted with the residue of an aromatic compound or further substituted with acyl is synthesized by a coupling reaction between an aromatic diazonium salt provided with an amino radical substituted with the residue of an aromatic compound or further substituted with acyl and coupler or between an aromatic diazonium salt and a coupler provided with an amino radical substituted with the residue of an aromatic compound or further substituted with acyl. Successively a developer portion in an oxidized form thereof is introduced to the thus obtained azo compound provided with the amino radical, then said amino radical is acylated in case amino in said amino radical has not been acylated and the resulting compound is subjected to reduction thereby obtaining a dye developer to be employed in the present invention. The introduction of said developer portion can also be achieved in the form of a precursor of a silver halide developing radical. In this case, the resulting compound having the precursor is subjected in succession to the hydrolysis and oxidation of the introduced precursor, acylation of said amino radical and finally reduction, in case amino in said amino radical has not been acylated; or to the hydrolysis only or the abovementioned successive steps if acyl in said amino radical is removed off by the hydrolysis, in case amino in said amino radical has been acylated; thereby to obtain the above-mentioned dye developer. This is also achieved by the subjection of the resulting compound to the acylation without said hydrolysis in case amino in said amino radical has not been acylated; thereby to obtain a dye developer adapted for use in the present invention and provided with a precursor of a silver halide developing radical as the developer portion thereof or in case the amino has been acylated, the resulting compound is used as it is. Furthermore the dye developer for use in the present invention can be obtained by introducing the developer portion in an oxidized form or a precursor form into an intermediate compound used in the synthesis of the above-mentioned azo compound provided with the amino or acylamino radical substituted with the aromatic radical.

In the following, there will be given detailed examples of the syntheses of dye developers to be employed in the present invention:

SYNTHESIS EXAMPLE 1

Synthesis of compound (2)

(1) Synthesis of 4-nitro-2'-phenylazodiphenylamine 5.0 g of o-aminoazobenzene, 5.03 g of p-bromonitrobenzene, 5.0 g of sodium acetate and 0.5 g of cuprous iodide were dispersed in 50 ml of nitrobenzene and heated for 4 hours on an oil bath (205°–215° C). The reaction mixture was steam to eliminate nitrobenzene and then extracted with benzene. The extract was added with sodium sulfate, then let to stand overnight and filtered. The filtrate was added with 15 g of silica gel, stirred for 30 minutes, then filtered and distilled to eliminate the solvent. Thus obtained dark brown residue was recrystallized from an ethanol-water mixture to obtain 3.0 g of the intended product.

Elementary analysis (%): Found: C 67.85; H 4.51; N 17.45; Calculated: C 67.92; H 4.43; N 17.59.

(2) Synthesis of 4-amino-2'-phenylazodiphenylamine 5.0 g of the compound obtained in step (1) and 15 g of sodium sulfide were dispersed in 500 ml of 80% ethanol and heated for 2 hours. The reaction mixture was allowed to cool, then neutralized with a 1-N hydrochloric acid and distilled under a reduced pressure to eliminate the solvent. The resulting precipitate was dissolved and extracted by the use of benzene and purified, after the solvent being distilled off, by chromatography with a silica gel column (a developing solvent: benzene) to obtain a reddish brown material which could not be crystallized.

(3) Synthesis of 2-phenylazo-4'-[β-(2",5"-dicathiloxyphenyl)propionamide]-diphenylamine 2.7 g of the compound obtained in step (2) and 3.4 g of β-(2,5-dicathiloxyphenyl)propionyl chloride were dissolved in 50 ml of dried benzene and stirred for 2 hours at room temperature. After the solvent being distilled off, the reaction mixture was subjected to purification by chromatography with a silica gel column (a developing solvent; benzene: ethyl acetate = 10:1) to obtain 4.9 g of the intended compound.

Elementary analysis (%): Found: C 44.35; H 8.19; N 15.94; Calculated: C 44.19; H 8.27; N 15.85.

(4) Synthesis of 2-phenylazo-4'-[β-(2",5"-dihydroxyphenyl)propionamide]-diphenylamine 5.8 g of the compound obtained in step (3) was dissolved in 100 ml of ethanol and sufficiently de-aired by introducing nitrogen. Thus obtained solution was rapidly added with 15 ml of a 25% sodium hydroxide solution previously de-aired with nitrogen, then stirred for 30 minutes under a nitrogen atmosphere and neutralized by the addition, under agitation, of 1-N hydrochloric acid previously de-aired with nitrogen. The precipitate obtained by distilling off the solvent was collected by filtration, washed with water and recrystallized from ethanol to obtain 4.1 g of the orange-colored intended compound.

Elementary analysis (%): Found: C 71.66; H 5.29; N 12.48; Calculated: C 71.67; H 5.35; N 12.37.

(5) Synthesis of 2-phenylazo-4'-[β-(2",5"-benzoquinonyl) propionamide]-diphenylamine 4.38 g of the compound obtained in step (4) and 4.1 g of p-benzoquinone were dissolved in 75 ml of chloroform, then heated under reflux for 3.5 hours and distilled to eliminate the solvent, and the resulting residue was washed well with water and purified by silica gel column chromatography (a developing solvent: ethyl acetate at first, then dichloromethane) to obtain 2.1 g of the intended compound as red crystals.

Elementary analysis (%): Found: C 71.8; H 5.03; N 12.35; Calculated: C 71.99; H 4.92; N 12.43.

(6) Synthesis of N-4'-[β-(2",5"-benzoquinonyl)propionamide]-phenyl-2-phenylazo-trifluoroacetanilide 4.4 g of the compound obtained in step (5) was dissolved in 500 ml of dried ether, and the resulting solution was added with 10 g of trifluoroacetic anhydride and stirred for 1 hour at room temperature. 200 ml of water was added upon completion of the reaction, and the resulting precipitate was collected by filtration, then washed with water and recrystallized from a benzene-n-hexane mixture to obtain 3.5 g of the intended compound as pale yellow crystals.

Elementary analysis (%): Found: C 63.69; H 3.85; N 10.25; Calculated: C 63.74; H 3.87; N 10.25.

(7) Synthesis of the compound example (2)

5.3 g of the compound obtained in step (6) and 7.0 g xylohydroquinone were dissolved in 300 ml of ethyl acetate and heated under reflux for 3 hours under a nitrogen gas. The solvent was distilled off upon completion of the reaction, and the product was recrystallized from ethanol-water mixture to obtain 4.5 g of the intended compound as pale yellow crystals with a melting point of 148°– 149° C.

Elementary analysis (%): Found: C 63.55; H 4.41; N 10.20; Calculated: C 63.50; H 4.23; N 10.21.

SYNTEHSIS EXAMPLE 2

Synthesis of compound (4)

Compond (4) was synthesized in a similar manner as employed for the synthesis of compound (2). The melting point of the obtained compound was 197°– 199° C.

Elementary analysis (%): Found: C 63.28; H 4.33; N 10.20; Calculated: C 63.50; H 4.23; N 10.21.

SYNTHESIS EXAMPLE 3

Synthesis of compound (7)

2-phenylazo-2'-[β-(2",5"-dicathiloxyphenyl)-propionamide]-diphenylamine which is obtained as an intermediate in the synthesis of compound (4) was acylated with trifluoroacetic anhydride to obtain compound (7) with a melting point of 79°– 82° C.

Elementary analysis (%): Found: C 60.63; H 4.29; N 8.30; Calculated: C 60.69; H 4.51; N 8.09.

SYNTHESIS EXAMPLE 4

Synthesis of compound (8)

Compound (8) was synthesized in a similar manner as employed for the synthesis of compound (7). The melting point of the obtained compound was 107°– 109° C.

Elementary analysis (%): Found: C 57.63; H 4.01; N 7.76; Calculated: C 57.82; H 4.16; N 7.70.

SYNTHESIS EXAMPLE 5

Synthesis of compound (9)

2-amino-4-ethoxy-4'-nitro-5-methyl-azobenzene obtained by a diazo coupling method was reacting in the presence of a copper catalyst with p-bromochlorobenzene to obtain 2-(p-nitrophenylazo)-4-methyl-4'-chloro-5-ethoxy-diphenylamine of which nitro radical was reduced with sodium sulfide to obtain 2-(p-aminophenylazo)-4-methyl-4'-chloro-5-ethoxy-diphenylamine. The introduction of the developer portion and the succeeding acylation of an amino radical were conducted in a similar manner as employed in the synthesis of compound (2). The melting point of the obtained product was 223°– 226° C.

Elementary analysis (%): Found: C 60.13; H 4.25; N 8.97; Calculated: C 59.96; H 4.40; N 8.74.

SYNTHESIS EXAMPLE 6

Synthesis of compound (10)

(1) Synthesis of 4-chloro-4'-methyl-diphenylamine 7.5 g of p-methylacetanilide, 9.6 g of p-bromochlorobenzene, 4.8 g of potassium carbonate and 0.2 g of a copper powder were dissolved or dispersed in 10 ml of nitrobenzene and heated under reflux for 13 hours. The reaction mixture was steam-distilled to eliminate nitrobenzene, then dissolved in ether and filtered. The residue obtained by distilling off ether from the filtrate was added with 30 ml of ethanol and 20 ml of a concentrated hydrochloric acid, and heated under reflux for 8 hours. The reaction mixture was allowed to cool, then neutralized with 2-N sodium hydroxide solution, and the resulting precipitate was collected by filtration, washed with water and recrystallized from n-hexane to obtain 6.0 g of the intended compound.

(2) Synthesis of 4-chloro-4'-methyl-2'-{p-2''-(2''',5'''-benzoquinonyl)ethyl phenylazo}-diphenylamine 13.3 g of 4-(2,5-dihydroxyphenethyl)aniline hydrochloride was dissolved in 600 ml of 25% hydrochloric acid, and 150 ml of 10% aqueous solution of sodium nitrite was added dropwise over 20 minutes under cooling with ice. The mixture was stirred for 2 hours under cooling with ice, then added with 1.0 g of a sulfamic acid to decompose excessive nitrite, and further added with 45 g of sodium acetate. The resulting diazonium salt solution was slowly added dropwise under cooling with ice to 500 ml of ethanolic solution containing 10.9 g of the compound obtained in step (1). Successively 400 ml of a saturated aqueous solution of sodium bicarbonate was added dropwise, and the mixture was stirred for 1.5 hours at room temperature. The resulting precipitate was collected by filtration, washed with water, then dried and recrystallized from ethanol to obtain 9.3 g of the yellow-orange intended compound.

Elementary compound (%): Found: C 70.97; H 4.61; N 9.24; Calculated: C 71.13; H 4.87; N 9.21.

(3) Synthesis of N-4'-chlorophenyl-2-{p-2''-(2''',5'''-benzoquinonyl)ethyl phenylazo}-4-methyltrifluoroacetanilide 4.5 g of the compound obtained in step (2) was dissolved in 500 ml of a dried ether, and 10 g of trifluoroacetic anhydride was added in small portions. The resulting solution was stirred for 1 hour at room temperature. 200 ml of water was added upon completion of the reaction, and the resulting precipitate was collected by filtration, washed with water and recrystallized from benzene-n-hexane mixture to obtain 3.9 g of the orange-yellow intended compound.

Elementary analysis (%):
Found: C 63.04; H 4.00; N 7.69;
Calculated: C 63.11; H.3.83; N 7.61. (4) Synthesis of compound (10)

5.5 g of the compound obtained in step (3) and 7.0 g of xylohydroquinone were dissolved in 300 ml of ethyl acetate and heated under reflux for 3 hours under a nitrogen atmosphere. The solvent was distilled off upon completion of the reaction, and the resulting product was recrystallized from an ethanol-water mixture to obtain 3.5 g of the intended compound as pale yellow crystals with a melting point of 168°–170° C.

Elementary analysis (%):
Found: C 63.17; H 4.06; N 7.62;
Calculated: C 62.88; H 4.19; N 7.58.

SYNTHESIS EXAMPLE 7

Synthesis of compound (47)

In 20 ml of a trifluoroacetic acid were dissolved 10.0 g of 3-hydroxydiphenylamine and 20 ml of an anhydrous trifluoroacetic acid was added. The resulting mixture was refluxed for 30 minutes. The trifluoroacetic acid and anhydrous trifluoroacetic acid were distilled off under reduced pressure and the residue was dissolved in 500 ml of ethanol.

On the other hand, to 19.7 g of p-(2,5-diacetoxyphenethyl)aniline hydrochloride were added 200 ml of water and 20 ml of a 35% hydrochloric acid. The resulting mixture was cooled to 0°–3° C and 20 ml of an aqueous solution of 4.1 g of sodium nitrite was added dropwise with stirring. After stirring for 30 minutes at 0° C, 0.4 g of a sulfamic acid and then 30.0 g of sodium acetate were added to form an aqueous solution of p-(2,5-diacetoxyphenethyl) benzenediazonium salt.

The aqueous solution of the above diazonium salt was added to the above ethanol solution at 5° C or lower and thereafter 300 ml of a saturated aqueous sodium bicarbonate solution was added. After stirring for 1 hour allowing the temperature to rise up to room temperature, the resulting oil was extracted with ethyl acetate. The extract was washed with water and dried and the ethyl estate was distilled off under reduced pressure. The residue was purified by means of column chromatography on silica gel and reprecipitated from benzene-n-hexane. The resulting crystal was collected by filtration and dried to give 19.6 g of yellow crystal melting at 80°–83° C.

SYNTHESIS EXAMPLE 8

Synthesis of compound (44)

Synthesis of 3-anilino-4-[p-(2',5'-dihydroxyphenethyl) phenylazo]phenol

In 200 ml of ethanol were dissolved 5.0 g of the azo dye as obtained in synthesis example 7 and 10 ml of an aqueous 25% sodium hydroxide solution which had previously been subjected to deairing was added under a nitrogen atmosphere. After stirring for 1 hour at room temperature, the reaction mixture was neutralized with 2N hydrochloric acid. The resulting product was extracted with ethyl acetate, washed with water and dried. The ethyl acetate was distilled off under reduced pressure and the residue was purified by means of column chromatography on silica gel and reprecipitated from ethyl acetate-n-hexane to give 2.6 g of reddish orange crystals melting at 206°–208° C.

Synthesis of Compound (44)

To 1.0 g of 3-anilino-4-[p-(2′,5′-dihydroxyphenethyl)-phenylazo]phenol were added 30 ml of Tetrahydrofran and 2 ml of an hydrous trifluoroacetic acid. The mixture was refluxed for 1 hour and thereafter the solvents were distilled off and the residue was extracted with ethyl acetate and washed with water until the washing became neutral. After being dried over sodium sulfate, the solution was concentrated and re-precipitated from n-hexane to give 1.1 g of yellow crystals melting at 95°–98° C.

SYNTHESIS EXAMPLE 9

Synthesis of compound (46)

A solution of 0.75 g of 3-[4-chloroanilino]-phenol in 1 ml of a trifluoroacetic acid and 1 ml of an anhydrous trifluoroacetic acid was refluxed for 1 hour and thereafter the solvents were distilled off under reduced pressure. The residue was dissolved in 50 ml of ethanol.

Diazotization and coupling were effected in the similar manner as described in Example 7, using the above ethanol solution and 1.23 g of p-(2,5-diacetoxyphenethyl) aniline hydrochloride. The resulting oil was extracted with ethyl acetate, washed with water and dried. The solvent was distilled off and the residue was reprecipitated from benzene-n-hexane to give 1.28 g of yellow crystals melting at 65°–69° C.

It is possible to synthesize various dye developers on the basis of the process explained in the foregoing. The following table shows the results of the elementary analyses conducted on the compounds synthesized as explained above:

| Exemplified Compound | Elementary Analysis (%) Calculated | | | Found | | |
|---|---|---|---|---|---|---|
| | C | H | N | C | H | N |
| 1 | 61.82 | 4.29 | 9.94 | 62.02 | 4.31 | 9.89 |
| 3 | 58.26 | 3.88 | 9.37 | 58.38 | 3.90 | 9.30 |
| 5 | 63.50 | 4.23 | 10.21 | 63.39 | 4.15 | 10.40 |
| 6 | 64.05 | 4.48 | 9.96 | 63.95 | 4.39 | 10.01 |
| 11 | 64.58 | 4.72 | 9.72 | 64.52 | 4.77 | 9.81 |
| 12 | 64.52 | 5.05 | 7.52 | 64.44 | 5.16 | 7.64 |
| 13 | 60.32 | 4.91 | 8.53 | 60.48 | 4.82 | 8.40 |
| 14 | 61.60 | 4.04 | 6.73 | 61.42 | 3.92 | 6.61 |
| 15 | 59.75 | 3.80 | 9.61 | 59.61 | 3.73 | 9.76 |
| 16 | 58.69 | 3.74 | 11.80 | 58.82 | 3.77 | 11.75 |
| 17 | 66.44 | 4.39 | 7.04 | 66.43 | 4.27 | 7.18 |
| 18 | 60.56 | 3.70 | 6.42 | 60.45 | 3.75 | 6.55 |
| 19 | 59.75 | 3.80 | 9.61 | 59.97 | 3.95 | 9.82 |
| 20 | 58.69 | 3.74 | 11.80 | 58.91 | 3.82 | 11.85 |
| 21 | 62.95 | 4.48 | 13.35 | 62.82 | 4.40 | 13.36 |
| 22 | 60.86 | 3.83 | 11.09 | 60.77 | 3.98 | 11.06 |
| 23 | 61.49 | 4.22 | 13.04 | 61.70 | 4.13 | 13.15 |
| 24 | 62.34 | 3.76 | 9.09 | 62.24 | 3.79 | 9.05 |
| 25 | 61.99 | 4.33 | 12.05 | 62.00 | 4.30 | 12.05 |
| 26 | 65.71 | 4.14 | 8.71 | 65.98 | 4.08 | 8.75 |
| 27 | 60.79 | 4.11 | 9.15 | 60.01 | 4.01 | 9.06 |
| 28 | 63.92 | 5.53 | 6.78 | 63.80 | 5.60 | 6.65 |
| 29 | 69.40 | 6.18 | 9.81 | 69.21 | 6.01 | 9.90 |
| 30 | 73.06 | 6.13 | 8.24 | 72.92 | 6.22 | 8.12 |
| 31 | 65.43 | 4.55 | 6.54 | 65.28 | 4.63 | 6.48 |
| 32 | 55.41 | 3.75 | 10.42 | 55.50 | 3.69 | 10.60 |
| 33 | 54.63 | 3.95 | 7.07 | 54.48 | 4.05 | 7.20 |
| 34 | 67.30 | 4.36 | 8.97 | 67.27 | 4.36 | 8.90 |
| 35 | 61.70 | 4.11 | 9.92 | 62.00 | 4.08 | 9.72 |

-continued

| Exemplified Compound | Elementary Analysis (%) Calculated | | | Found | | |
|---|---|---|---|---|---|---|
| | C | H | N | C | H | N |
| 36 | 66.22 | 4.21 | 9.36 | 66.41 | 4.48 | 9.61 |
| 37 | 72.71 | 5.90 | 8.48 | 72.88 | 5.86 | 8.57 |
| 38 | 66.08 | 4.23 | 12.17 | 66.25 | 4.20 | 12.02 |
| 39 | 57.07 | 3.80 | 9.79 | 56.85 | 3.93 | 9.88 |
| 40 | 62.59 | 4.20 | 10.43 | 62.63 | 4.42 | 10.21 |
| 41 | 63.16 | 4.62 | 9.44 | 62.93 | 4.65 | 9.62 |
| 42 | 54.33 | 3.95 | 8.45 | 54.05 | 3.88 | 8.62 |
| 43 | 59.36 | 3.74 | 9.89 | 59.21 | 3.78 | 9.98 |
| 44 | 64.49 | 4.25 | 8.06 | 64.25 | 4.05 | 7.89 |
| 45 | 60.49 | 3.81 | 7.56 | 60.40 | 3.73 | 7.47 |
| 46 | 60.04 | 3.94 | 6.57 | 60.00 | 3.81 | 6.62 |
| 47 | 63.47 | 4.33 | 6.94 | 63.71 | 4.51 | 7.01 |
| 48 | 65.04 | 4.52 | 7.85 | 65.35 | 4.67 | 7.98 |
| 49 | 59.70 | 3.84 | 6.96 | 59.56 | 4.01 | 7.12 |
| 50 | 57.34 | 4.01 | 6.69 | 57.13 | 4.27 | 6.81 |
| 51 | 56.01 | 4.07 | 6.53 | 55.88 | 4.26 | 6.77 |
| 52 | 61.70 | 4.32 | 7.20 | 61.48 | 4.51 | 7.13 |
| 53 | 56.57 | 4.07 | 7.54 | 56.72 | 3.97 | 7.36 |
| 54 | 58.15 | 3.70 | 9.35 | 57.92 | 3.89 | 9.16 |
| 55 | 64.75 | 5.94 | 7.08 | 64.72 | 6.18 | 6.95 |
| 56 | 59.44 | 3.96 | 7.17 | 59.63 | 3.77 | 7.41 |
| 57 | 63.42 | 3.83 | 6.93 | 63.23 | 4.02 | 7.00 |
| 58 | 56.70 | 3.75 | 8.01 | 56.51 | 4.01 | 8.13 |
| 59 | 58.78 | 4.21 | 8.07 | 58.90 | 4.18 | 8.25 |
| 60 | 60.44 | 4.18 | 10.37 | 60.60 | 4.25 | 10.49 |
| 61 | 56.75 | 3.92 | 13.62 | 56.54 | 3.97 | 13.48 |
| 62 | 61.54 | 5.00 | 8.97 | 61.70 | 4.88 | 8.91 |
| 63 | 64.74 | 5.07 | 10.07 | 65.01 | 5.02 | 10.11 |
| 64 | 61.63 | 4.31 | 9.98 | 61.77 | 4.29 | 10.03 |
| 65 | 60.78 | 4.66 | 10.13 | 60.80 | 4.72 | 10.10 |
| 66 | 60.76 | 3.66 | 8.86 | 60.59 | 3.80 | 8.75 |
| 67 | 65.41 | 4.12 | 7.15 | 65.50 | 4.05 | 6.94 |
| 68 | 64.43 | 4.05 | 8.54 | 64.57 | 3.91 | 8.43 |
| 69 | 63.43 | 3.83 | 6.93 | 63.21 | 3.70 | 7.17 |
| 70 | 65.42 | 4.12 | 7.15 | 65.19 | 4.07 | 7.34 |
| 71 | 63.94 | 4.29 | 7.46 | 63.72 | 4.53 | 7.54 |
| 72 | 66.24 | 4.82 | 7.72 | 66.52 | 4.88 | 7.81 |
| 73 | 61.96 | 3.50 | 6.35 | 61.82 | 3.37 | 6.41 |

The formation of a dye image by the use of a dye developer of the present invention thus synthesized can be achieved preferably by the diffusion transfer color photographic process, but, if desired, it is also achievable with so-called internal or external silver dye bleach color photographic process wherein said dye developer is incorporated either in a silver halide emulsion or in a processing liquid respectively. Said diffusion transfer dye image forming process provides a positive dye image on an image receiving element, but it is also possible to simultaneously obtain a negative dye image on the photosensitive element by eliminating silver therefrom by means of an ordinary silver bleaching process. Also it is possible to obtain a monochromic dye image or a dichromic dye image for example for pseudo color photography by employing one or two combinations of a silver halide emulsion and a dye developer. The present invention is applicable not only to a diffusion transfer color photographic material but also to negative, reversal or direct reversal photographic films and papers of internal or external type, but the most preferable advantages by the present invention is obtained in a diffusion transfer color photographic materials.

A diffusion transfer color photographic material consists essentially of a combination of a photosensitive element comprising a photosensitive silver halide emulsion and an image receiving element capable of fixing a dye thereon. Said silver halide emulsion is a hydrophilic colloidal dispersion of silver bromide, silver iodide, silver chloride, silver iodobromide, silver chlorobromide, silver chloroiodide, silver iodobromide or a mixture thereof and can be prepared through various processes for example so-called Lippman process or conversion process. Also the particle size, content and mixing ratio of silver halide are selected within a wide range according to the kind of the desired photographic material. The hydrophilic protective colloid which functions as a dispersant for silver halide can be of various colloids such as gelatin, polyvinyl alcohol etc. Furthermore such silver halide as explained above can be chemically sensitized by active gelatin; sulfur sensitizers such as allylthiocarbamide, thiourea, cystine etc.; selenium sensitizers; or precious metal sensitizers for example those based on gold, ruthenium, dhodium, iridium etc.; singly or in combination. Further such silver halide emulsion can be spectrally sensitized for example by cyanine dyes or merocyanine dyes, and thus a color photographic material can usually be prepared from three silver halide emulsions sensitive to different photosensitive wavelength ranges.

Furthermore such silver halide emulsion can be stabilized by triazoles, azaindenes, quaternary benzothiazolium compounds, or zinc or cadmium compounds, and may further contain sensitizers of quaternary ammonium structure or polyethylene glycol structure. Furthermore such silver halide emulsion may contain a gelatin plasticizer for example glycerin, a dihydroxyalkane such as 1,5-pentadiol, ethylene bisglycollic esters, bis-ethoxydiethylene glycol succinate, acrylic acid amides, latex etc., and may further contain other photographic additive materials such as gelatin hardener for example formaldehyde, a halogenated fatty acid such as mucobromic acid, a compound with acid anhydride radical, dicarboxylic acid chloride, methanesulfonate biesters or sodium bisulfite derivatives of dialdehydes in which aldehyde radicals are separated by two or three carbon atoms, or a coating and such as saponin and sulfosuccinic salts. Furthermore said silver halide emulsion may contain, if necessary, an anti-fogging agent, an ultraviolet absorbing agent or other additive substances ordinarily employed in the photographic materials.

The above-mentioned photosensitive element usually comprises the combinations of such silver halide emulsions and dye developers. In case of a subtractive color photographic process, the silver halide emulsions sensitive to blue light, green light and red light are respectively associated with yellow, magenta and cyan dye developers, or, preferably, with shifting color developers of which light absorption ranges are shifted to shorter wavelength ranges. A preferred layer structure of the photosensitive element is coatings arranged in an order of blue-sensitive, green-sensitive and red-sensitive emulsions from the exposure side, and may further contain a yellow filter layer between said blue-sensitive and green-sensitive emulsions. The abovementioned combination of a photosensitive silver halide emulsion and a dye developer can be obtained by incorporating said developer into a separate layer adjacent to the layer of said emulsion, or by incorporating said developer into the layer of said emulsion as the sensitivity of emulsion is not affected by the presence of a shifting dye developer.

The dye developer employed in the present invention is dissolved in a minimum necessary amount of an organic solvent and dispersed in a hydrophilic protective colloid such as gelatin or polyvinyl alcohol which colloid is employed as a binder for the silver halide emulsion layer or an adjacent layer in the photosensitive element. Said organic solvent can be a single high-boiling solvent or a combination of such high-boiling solvent and a low-boiling solvent which can be eliminated from said dispersion by evaporation in a later process.

For example the method disclosed in Japanese Patent Publication 13837/68 can be employed for the dispersion of dye developers of the present invention. Examples of such high-boiling solvent particularly useful in the present invention are N-n-butylacetanilide, diethyl laurylamide, dibutyllaurylamide, dibutyl phthalate and tricresyl phosphate. Also the examples of suitable low-boiling solvent are ethyl acetate, methyl acetate and 4-methylcyclohexanone. Furthermore the dye developers of the present invention can be directly dispersed in water-soluble colloids in the form of fine particles without the presence of such high-boiling solvent, as disclosed in Japanese Patent Publication 32131/68 and U.S. Pat. No. 3,832,173.

The amount of a dye developer to be employed in the present invention may be variable within a wide range according to the kind of the compound used and the desired result, but is is preferably present in an amount of about 0.5 to 10% by weight in the coating liquid of a water-soluble organic colloid.

In the case of a three-color photographic process, the photosensitive element advantageously contains an intermediate layer which can be either of a hydrophilic polymer such as gelatin, polyacrylamide, partially hydrolized polyvinyl acetate or hydroxypropyl cellulose or of a porous polymer prepared from a latex of a hydrophilic polymer and a hydrophobic polymer as disclosed in the U.S. Pat. No. 3,625,685.

The substrate or support for the photosensitive element of the present invention can be, for example, of paper, glass, cellulose nitrate, cellulose acetate, polyvinyl acetal, polystyrene, polyethylene terephthalate, polypropylene, polyethylene or other natural or synthetic polymers, and can be transparent or opaque according to the purpose.

The photosensitive element explained in detail in the foregoing is processed by superposing on an image receiving element after an image wise exposure as explained later and by extending therebetween an alkaline processing liquid which is also explained later in detail.

The image receiving element which is used for mordanting the dye developer transferred by diffusion from the aforementioned photosensitive element is suitably constructed according to the purpose of use as will be explained later.

The image receiving element is provided with a substrate which can be suitably selected as in the case of a photosensitive element, and which can likewise be transparent or opaque.

The image receiving element is practically provided with a mordant layer. lThe mordant adapted for use in the mordant layer in such element can be any compound provided with an adequate mordanting effect on the dye developer transferred by diffusion, but, for the dye developers of the present invention there can be mentioned for example poly-4-vinyl-pyridine, cetyl trimethylammonium bromide and the like. Also the mordants disclosed in U.S. Pat. No. 2,882,156 and in Belgian Pat. No. 729,202 are advantageously applicable to the present invention. The above-mentioned mordants can be dispersed for example in gelatin, polyvinyl alcohol etc.

Upon substantial completion of the formation of a dye image by diffusion transfer of the dye developer in the unexposed area to the image receiving element through the application of an alkaline processing liquid, it becomes necessary to reduce the pH value in the film unit to almost neutral thereby increasing the stability of thus transferred dye developer thereby substantially forbidding the image formation thereafter and preventing discoloration or staining of image at higher pH. For this purpose the image receiving element advantageously contains a neutralizing layer containing a substance capable of satisfactorily lowering the pH. For such substance, polymer acids or the partial esters thereof or anhydrides thereof as disclosed in U.S. Pat. No. 3,362,819 or metal salts of solid acids as disclosed in U.S. Pat. No. 2,584,030 can be effectively utilized in the present invention.

Furthermore, in order to control the lowering speed of the pH value it is preferable to use a spacer layer composed for example of gelatin, hydroxypropyl cellulose, an acrylic latex, polyacrylamide or the mixtures thereof.

Furthermore the image receiving element may contain an ultraviolet absorbing agent, a fluorescent whitening agent or other additive materials ordinarily employed in the photographic technology.

The alkaline processing liquid used for developing the exposed photosensitive silver halide is usually provided with strong alkalinity, ordinarily higher than pH 12. The alkaline process liquid to be employed in the present invention contains alkali hydroxides or alkali earth hydroxides such as sodium hydroxide, potassium hydroxide, calcium hydroxide, lithium hydroxide etc. The processing liquid may further contain a developing inhibitor such as benzotriazole. Further, the processing liquid may also contain a thickening agent such as hydroxyethyl cellulose, carboxymethyl cellulose sodium salt etc. The processing liquid preferably contains an onium compound such as a quaternary ammonium salt. Examples of such onium compounds particularly suitable for the present invention are 1-benzyl-2-picolinium bromide, 1-phenetyl-2-picolinium bromide etc., but the onium compounds disclosed in U.S. Pat. Nos. 3,411,904 and 3,173,786 are also usable in the present invention.

Said processing liquid may further contain titanium dioxide as a light reflecting material. Also the light reflecting methods as disclosed in Japanese Laid-Open-Patents publication Nos. 486/71 and 477/72 are usable in the present invention. Furthermore the processing liquid may contain an opacifier such as carbon black or indicator dyes as disclosed in Japanese Laid-Open-Patent publication Nos. 26/72, 27/72 and 28/72.

A development inhibitor such as 1-phenyl-5-mercaptotetrazole or benzylaminopurine may be contained in the photosensitive element, the image receiving element or the processing liquid. Also in the present invention it is advantageous that an auxiliary developing agent such as p-tolylhydroquinone or phenidone is contained in the photosensitive element, image receiving element or processing liquid. In the present invention, there can be advantageously employed the auxiliary developing agents disclosed in Japanese Patent Publication No. 17383/40, U.S. Pat. Nos. 2,939,788, 3,192,044 and 3,462,266, British Pat. No. 1,243,539, Japanese Laid-Open-Patent Publications Nos. 40128/74, 83440/74, 84238/74 and 6340/75. Such auxiliary developing agent can be added to the photosensitive element or image receiving element by dissolving such developing agent in an organic solvent and dispersing the obtained solution in the photosensitive element or image receiving element. Said solvent can be a high-boiling solvent or a combination of such high-boiling solvent and a low-boiling solvent which can be eliminated from the dispersion by evaporation. Examples of such useful high-boiling solvent are diethyl laurylamide, dibutyl laurylamide, dibutyl phthalate, N-n-butylacetanilide, tricresyl phosphate etc. Also such auxiliary developing agent may be uniformly contained in the image receiving element as disclosed in Japanese Laid-Open-Patent Publication No. 131134/74.

The film unit to be employed in the present invention can be composed of separate photosensitive element and image receiving element before the exposure to light, or a combined unit in which said two elements are jointly present. Also the photosensitive element may remain combined with the image receiving element after the processing, or may be peeled off from the image receiving element. In the present invention there can be employed film units as disclosed in U.S. Pat. Nos. 3,415,644, 3,415,645, 3,415,646, 3,473,925, 3,573,042, 3,573,043, 3,594,164, 3,594,165 and 3,615,421, Belgian Pat. Nos. 757959 and 757960.

The present invention is illustrated in further detail below with reference to examples, but the invention is not limited to these examples.

EXAMPLE 1

Onto a transparent cellulose triacetate film which had been subbed with gelatin, each of the following layers were successively coated to prepare sensitive element I.

(1) A yellow dye developer layer

One part of compound (9) was dissolved in one part of N,N-diethyllaurylamide and 3 parts of ethyl acetate, and the resulting solution was added to an aqueous gelatin solution containing a dispersing agent, "Alkanol B", to obtain an emulsion which was then coated onto the film. The amounts coated were 1.3 g/m² of compound (9), 1.3 g/m² of N,N-diethyllaurylamide and 2.5 g/m² of gelatin.

(2) A blue sensitive emulsion layer

At the ratio of 2.8 g/m² of silver and 3.0 g/m² of gelatin, a blue-sensitive silver iobromide emulsion was coated.

(3) A protective layer

One part of p-tolyl hydroquinone was dissolved in one part of dibutyl phthalate and 1.7 parts of ethyl acetate, and the resulting solution was added to an aqueous gelatin solution to obtain an emulsion, which after the addition of mucochloric acid as a hardener was then coated. The amounts coated were 0.22 g/m² of p-tolyl hydroquinone, 0.22 g/m² of dibutyl phthalate and 0.5 g/m² of gelatin.

Image-receiving element was formed by successively applying each of the following layers onto a baryta paper.

(1) A neutralization layer

A 5% solution of the half butyl ester of a copolymer of maleic anhydride and ethylene in acetone was applied. The dry film thickness was 20 μ.

(2) A spacer layer

An aqueous hydroxypropyl cellulose solution was applied. The dry film thickness was 8 μ.

(3) An image-receiving layer

One part of poly-4-vinylpyridine and 2 parts of polyvinyl alcohol were dissolved in 0.5 parts of glacial acetic acid and 150 parts of water, and further 0.05 parts of 1-phenyl-5-mercaptotetrazole was added, and then the resulting mixture was used for coating. The amounts coated were 3.0 g/m² of poly-4-vinylpyridine, 6.0 g/m² of polyvinyl alcohol and 0.15 g/m² of 1-phenyl-5-mercaptotetrazole.

Sensitive element II was prepared in the same manner as for sensitive element I, except that comparative compound (A) as indicated below was used instead of compound (9) of sensitive element I, and sensitive element III was prepared in the same manner as for sensitive element I, except that the comparative compound (B) as indicated below was used instead of compound (9) of sensitive element I. Sensitive elements I, II and III were exposed through an optical wedge to blue light from the side of the emulsion layer or from the side of the side of the film base. Then, each of them was combined with the image-receiving element. Between the sensitive element and image-receiving element the alkaline processing liquid having the below-indicated composition was spread at a layer thickness of 20 μ.

Comparative compound (A)

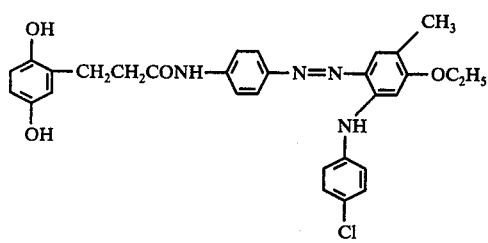

Comparative compound (B)

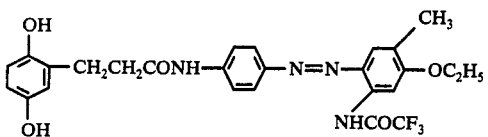

Alkaline processing liquid

| Water | 100 | ml |
|---|---|---|
| Potassium hydroxide | 11.2 | g |
| Sodium salt of carboxylmethyl-cellulose | 3.5 | g |
| Benzotriazole | 2.0 | g |
| 1-Phenethyl-2-picolinium bromide | 2.0 | g |

After one minute, the image-receiving element was removed from the sensitive element, and the maximum density (Dmax.) and the minimum density (Dmin.) of the yellow color image which had been obtained on the image-receiving element were determined using a blue filter.

| Sensitive element | Direction of exposure | Dmax. | Dmin. |
|---|---|---|---|
| I | Opposite side to the support | 1.54 | 0.09 |
| II | " | 1.56 | 0.10 |
| III | " | 0.20 | 0.09 |
| I | Same side of the support | 0.20 | 0.09 |
| II | " | 1.64 | 1.38 |
| III | " | 0.22 | 0.09 |

The image-receiving element obtained from the sensitive element III was immersed in an aqueous 2N potassium hydroxide solution for 30 minutes, washed with water, dried and then tested to determine the image density using a blue filter.

| Direction of exposure | Dmax. | Dmin. |
|---|---|---|
| Opposite side to the support | 0.38 | 0.10 |

| Direction of exposure | Dmax. | Dmin. |
|---|---|---|
| Same side of the support | 0.36 | 0.11 |

With respect to sensitive element II, the exposure from the same side of the support yielded a significant increase in minimum density comparing with the exposure from the opposite side of the support. This means that remarkable desensitization took place due to comparative compound (B). As regards sensitive element III, no desensitization was observed, but the maximum density was poor when the processing time was one minute. This means that it took a longer time to regenerate color. To the contrary, sensitive element I did not suffer from desensitization with exemplified compound (9) and could quickly regenerate color.

EXAMPLE 2

Onto a transparent cellulose triacetate film which had been subbed with gelatin, each of the following layers were successively coated to prepare sensitive element IV.

(1) A yellow dye developer - blue sensitive emulsion layer

One part of compound (4) was dissolved in 25 parts of acetone. the resulting solution was introduced into 125 parts of water to cause precipitation. The precipitate was obtained by filtration and then added to an aqueous gelatin solution containing "Alkanol B". The dispersion thus formed was added to a blue sensitive emulsion and the total emulsion was coated. The amounts coated were 1.8 g/m² of compound (2) and 4.0 g/m² of gelatin.

(2) A protective layer

The application was carried out as in Example 1.

Sensitive element IV was exposed as in Example 1 and an yellow color image was obtained on the image-receiving element. The result was as follows:

| Direction of exposure | Dmax. | Dmin. |
|---|---|---|
| Opposite side of the support | 1.48 | 0.08 |
| Same side of the support | 1.49 | 0.07 |

EXAMPLE 3

Except that each of compounds (2), (7), (8), (10), (19), (21), (22), (28), (31) and (39) was used instead of compound (9) of sensitive element I, a number of sensitive elements were prepared as in sensitive element I. Each of the sensitive elements was exposed from the same side of the support and treated with the alkaline processing liquid of Example 1 for one minute to obtain the following result.

| Compounds | Dmax. | Dmin. |
|---|---|---|
| (2) | 1.73 | 0.09 |
| (7) | 1.60 | 0.08 |
| (8) | 1.48 | 0.06 |
| (10) | 1.53 | 0.08 |
| (19) | 1.52 | 0.10 |
| (21) | 1.53 | 0.07 |
| (22) | 1.58 | 0.11 |
| (28) | 1.50 | 0.09 |
| (31) | 1.51 | 0.08 |
| (39) | 1.48 | 0.08 |

EXAMPLE 4

A sensitivie element was prepared in the same manner as in Example 1, except that compound (18) was used instead of compound (9) of sensitive element I. The sensitive element thus obtained was exposed through an optical wedge from the same side or opposite side of the support to green light and then treated with an alkaline processing liquid for one minute. The density of color image obtained on the image-receiving element was determined using a green filter and the result is as follows:

| Direction of exposure | Dmax. | Dmin. |
|---|---|---|
| Opposite side of the support | 1.74 | 0.11 |
| Same side of the support | 1.73 | 0.10 |

EXAMPLE 5

Onto a transparent polyethylene terephthalate film base, each of the following layers were successively applied to prepare sensitive element V.

(1) A yellow dye developer layer

Compound (9) was dissolved in a mixed solvent of N-n-butylacetoanilide and 4-methylcyclohexanone, and the resulting solution was dispersed in an aqueous gelatin solution containing "Alkanol B". The dispersion thus obtained was applied to the film base. The amounts coated were 4.4 g/m² of gelatin and 2.3 g/m² of the dye developer.

(2) A blue sensitive emulsion layer

The blue sensitive emulsion was applied in amounts of 2.4 g/m² of silver and 2.4 g/m² of gelatin.

(3) A yellow colloidal silver filter layer (4) An intermediate layer

The application of these layers was effected to have 2.0 g/m² of gelatin.

(5) A magenta dye developer layer

2-[p-($\beta$-Hydroquinonylethyl)phenylazo]-4-n-propoxy-1-acetoxy naphthalene was dissolved in a mixed solvent of N,N-diethyl laurylamide and ethyl acetate, and the resulting solution was dispersed into an aqueous gelatin solution containing a dispersing agent, "Alkanol B". The dispersion obtained was used for coating. The amounts coated were 2.9 g/m² of gelatin and 1.4 g/m₂ of the dye developer.

(6) A green sensitive emulsion layer

A green sensitive silver iodobromide emulsion was applied so as to be 1.2 g/m² of silver and 1.2 g/m² of gelatin in an amount.

(7) An intermediate layer

Gelatin was applied so as to be 1.5 g/m² in an amount.

(8) A cyan dye developer layer 1,5-Bis-(N-[p-(-62 -hydroquinonylethyl)phenyl]-N-trifluoroacetylamino)-4,8-dihydroxyanthraquinone was dissolved in a mixed solvent of N,N-diethyllaurylamide and ethyl acetate, and the resulting solution was dispersed in an aqueous gelatin solution containing a dispersing agent, "Alkanol B". The dispersion thus obtained was used for coating. The amounts coated were 1.1 g/m² of gelatin and 0.5 g/m² of the dye developer.

(9) A red sensitive emulsion layer

A red sensitive siliver iodobromide emulsion was applied so as to be 0.6 g/m² of silver and 0.6 g/m² of gelatin in an amount.

(10) A protective layer p-Tolyl hydroquinone was dissolved in N,N-diethyllaurylamide, and the resulting solution was dispersed into an aqueous gelatin solution. The dispersion obtained was used for coating. The amounts coated were 0.5 g/m² of p-tolyl hydroquinone and 0.6 g/m² of gelatin. Except that a transparent polyethylene terephthalate film base was employed instead of the baryta paper of Example 1 in an image-receiving element, an image-receiving element was prepared in the same manner as in Example 1. The alkaline processing liquid of Example 1 was modified by addition of 40 g of titanium dioxide.

From the same side of the support, the sensitive element was exposed through an optical wedge to blue, green or red light. The alkaline processing liquid was spread between the image-receiving element and sensitive element to a thickness of 100 $\mu$, whereby the development was effected. After a few minutes, a positive image corresponding to the exposure amount of blue, green or red light could be obtained.

EXAMPLE 6

Onto a transparent cellulose triacetate film which had been subbed with gelatin, each of the following layers were successively coated to prepare sensitive element VI.

(1) A yellow dye developer layer

One part of the exemplified compound (48) was dissolved in one part of N,N-diethyllaurylamide and 3 parts of ethyl acetate, and the resulting solution was added to an aqueous gelatin solution containing a dispersing agent, "Alkanol B", to obtain an emulsion which was then coated onto the film. The amounts coated were 1.12 g/m² of compound (48), 1.1 g/m² of N,N-diethyllaurylamide and 2.5 g/m² of gelatin.

(2) A blue sensitive emulsion layer

At the ratio of 2.8 g/m² of silver and 3.0 g/m² of gelatin, a bule-sensitive silver iobromide emulsion was coated.

(3) A protective layer

One part of p-tolyl hydroquinone was dissolved in one part of dibutyl phthalate and 1.7 parts of ethyl acetate, and the resulting solution was added to an aqueous gelatin solution to obtain an emulsion, which after the addition of mucochloric acid as a hardener was then coated. The amounts coated were 0.22 g/m² of p-tolyl hydroquinone, 0.22 g/m² of dibutyl phthalate and 0.5 g/m² of gelatin.

Sensitive element VII was prepared in the same manner as for sensitive element VI, except that comparative compound (C) as indicated below was used instead of compound (48) of sensitive element VI.

Comparative compound (A)

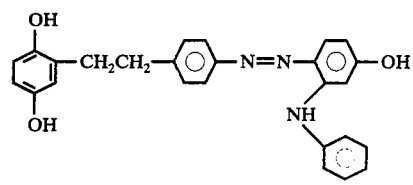

Sensitive elements VI and VII were exposed through an optical wedge to blue light from the side of the emulsion layer or from the side of the film base. Then, each of them was combined with the same image-receiving element as prepared in Example 1. Between the sensitive element and image-receiving element the alkaline processing liquid having the same composition as used in Example 1 was spread at a layer thickness of 20 μ.

After one minute, the image-receiving element was removed from the sensitive element, and the maximum density (Dmax.) and the minimum density (Dmin.) of the yellow color image which had been obtained on the image-receiving element were determined using a blue filter.

| Sensitive element | Direction of exposure | Dmax. | Dmin. |
|---|---|---|---|
| VI | Opposite side to the support | 1.72 | 0.11 |
| VII | Do. | 1.75 | 0.13 |
| VI | Same side of the support | 1.74 | 0.12 |
| VII | Do. | 1.79 | 1.45 |

As regards sensitive element VII, the exposure from the same side of the support yielded a extreme increase in minimum density comparing with the exposure from the opposite side of the support. This means that remarkable desensitization took place due to comparative compound (C).

EXAMPLE 7

Except that comparative compound (D), was used instead of exemplified compound (18) of sensitive element VI, a sensitive element as prepared as in sensitive element I. The sensitive element was exposed from the side of the support and treated with the alkaline processing liquid of Example 1 for one minute to obtain the following result.

Comparative compound (D)

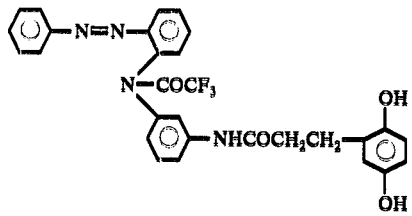

| Sensitive element | Dmax. | Dmin. |
|---|---|---|
| VI | 1.72 | 0.11 |
| VIII | 1.45 | 0.07 |

Sensitive element VI apparently showed an increase in Dmax. in comparison with Sensitive element VIII, this indicating the better effectiveness of a hydroxy group as a solubilizing group.

EXAMPLE 8

Onto a transparent cellulose triacetate film which had been subbed with gelatin, each of the following layers were successively coated to prepare sensitive element IX.

(1) A yellow dye developer — blue sensitive emulsion layer

One part of compound (47) was dissolved in 25 parts of methanol. The resulting solution was introduced into 125 parts of water to cause precipitation. The precipitare was obtained by filtration and then added to an aqueous gelatin solution containing "Alkanol B". The dispersion thus formed was added to a blue sensitive emulsion and the total emulsion was coated on the film.

The amounts coated were found to be 1.3 g/m² of compound (47) and 2.8 g/m² of gelatin.

(2) A protective layer

The application was carried out as in Example 6.

Sensitive element IX was exposed as in Example 6 and an yellow color image was obtained on the image-receiving element. The result was as follows:

| Direction of exposure | Dmax. | Dmin. |
|---|---|---|
| Opposite side of the support | 1.67 | 0.16 |
| Same side of the support | 1.70 | 0.17 |

EXAMPLE 9

Except that each of the exemplified compounds (45), (54) and (56), was used instead of compound (48) of sensitive element VI, a number of sensitive elements were prepared as in sensitive element VI. Each of sensitive elements was exposed from the same side of the support and treated with the alkaline processing liquid of Example 1 for one minute to obtain the following result.

| Exemplified compounds | Dmax. | Dmin. |
|---|---|---|
| (45) | 1.70 | 0.08 |
| (54) | 1.62 | 0.08 |
| (56) | 1.58 | 0.07 |

EXAMPLE 10

A sensitive element was prepared in the same manner as in Example VI, except that compound (58) was used instead of compound (48) of the sensitive element VI. The sensitive element thus obtained was exposed through an optical wedge from the same side or opposite side of the support to green light and then treated with an alkaline processing liquid for one minute. The density of color image obtained on the image-receiving element was determined using a green filter and the result is as follows.

| Direction of exposure | Dmax. | Dmin. |
|---|---|---|
| Opposite side of the support | 1.68 | 0.13 |
| Same side of the support | 1.65 | 0.11 |

EXAMPLE 11

Onto a transparent polyethylene terephthalate film base, each of the following layers were successively applied to prepare sensitive element X.

(1) A yellow dye developer layer

Compound (48) was dissolved in a mixed solvent of N-n-butylacetoanilide and 4-methylcyclohexanone, and the resulting solution was dispersed in an aqueous gelatin solution containing "Alkanol B". The dispersion thus obtained was applied to the film base. The amounts coated were 2.2 g/m² of gelatin and 2.1 g/m² of the color developer.

(2) A blue sensitive emulsion layer

The blue sensitive emulsion was applied in the amounts of 2.4 g/m² of silver and 2.4 g/m² of gelatin.

(3) A yellow colloidal silver filter layer (4) An intermediate layer

The application of these layers was effected to have 2.0 g/m² of gelatin.

(5) A magenta dye developer layer

2-[p-(β-Hydroquinonylethyl)phenylazo]-4-n-propoxy-1-acetoxy naphthalene was dissolved in a mixed solvent of N,N-diethyl laurylamide and ethyl acetate, and the resulting solution was dispersed into an aqueous gelatin solution containing a dispersing agent, "Alkanol B". The dispersion obtained was used for coating. The amounts coated were 2.9 g/m² of gelatin and 1.4 g/m² of the color developer.

(6) A green sensitive emulsion layer

A green sensitive silver iodobromide emulsion was applied so as to be 1.2 g/m² of silver and 1.2 g/m² of gelatin in an amount.

(7) An intermediate layer

Gelatin was applied so as to be in 1.5 g/m² in an amount.

(8) A cyan color developer layer 1,5-Bis-(N-[p-(β-hydroquinonylethyl)phenyl]-N-trifluoroacetylamino)-4,8-dihydroxyanthraquinone was dissolved in a mixed solvent of N,N-diethyllaurylamide and ethyl acetate, and the resulting solution was dispersed in an aqueous gelatin solution containing a dispersing agent, "Alkanol B". The dispersion thus obtained was used for coating. The amounts coated were 1.1 g/m² of gelatin and 0.5 g/m² of the dye developer.

(9) A red sensitive emulsion layer

A red sensitive silver iodobromide emulsion was applied so as to be 0.6 g/m² of silver and 0.6 g/m² of gelatin in an amount.

(10) A protective layer p-Tolyl hydroquinone was dissolved in N,N-diethyllaurylamide, and the resulting solution was dispersed into an aqueous gelatin solution. The dispersion obtained were used for coating. The amounts coated was to be 0.5 g/m² of p-tolyl hydroquinone and 0.6 g/m² of gelatin. Except that a transparent polyethylene terephthalate film base was employed instead of the baryta paper of Example 1 in an image receiving element, an image-receiving element was prepared in the same manner as in Example 1. The alkaline processing liquid of Example 1 was modified by addition of 40 g of titanium dioxide.

From the same side of the support, the sensitive element was exposed through an optical wedge to blue, green or red light. The alkaline processing liquid was spread between the image-receiving element and sensitive element to a thickness of 100 μ, whereby the development was effected. After a few minutes, a positive image corresponding to the exposure amount of blue, green or red light could be obtained.

What we claim is:

1. In a process for forming a dye image on a receiving element by diffusion transfer from a photosensitive element comprising a support and a silver halide photosensitive layer thereon wherein said photosensitive element is imagewise exposed, the improvement comprising:
    (a) processing the exposed photosensitive element with an alkaline solution in the presence of a dye developer having one azo radical therein to form an image of a diffusible dye in said photosensitive element, said dye developer being represented by the formula

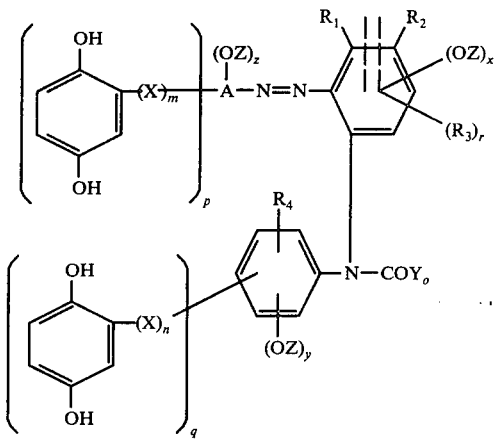

wherein A represents substituted or unsubstituted aromatic hydrocarbon, aromatic heterocyclic ring, or active methylene or active methine-containing compound-residue which can have at least one substituent selected from alkyl, aromatic hydrocarbon, alkoxy, aryloxy, halogen, nitro, cyano, acylamino, alkylamino, amyl, acyloxy, aralkyl, hydroxyl, amino, carbamoyl, sulfamoyl, and arylamino;

$R_1$, $R_2$, and $R_3$ individually represent hydrogen, halogen, nitro, alkyl, halogen-substituted alkyl, alkyloxy, aryloxy, alkylamido, arylamido, carbamoyl or sulfamoyl, and $R_1$ and $R_2$ can co-operatively form a naphthalene nucleus and, in that case, $R_3$ is bonded to any position of the naphthalene nucleus;

$R_4$ represents hydrogen, alkyl, aromatic hydrocarbon, alkoxy, aryloxy, halogen, nitro, cyano, acylamino, alkylamino, amyl, acyloxy, aralkyl, hydroxyl, amino, carbamoyl, sulfamoyl, and arylamino;

X represents a —CO—, —N(alkyl)—, —NH—, —S—, —O—, —SO₂—, alkylene, allylene, —NHCO alkylene—, —SO₂NH alkylene—, NHCO alkylene S—, divalent alicyclic or divalent heterocyclic group;

Yo represents alkyl of 1 to 5 carbon atoms being substituted with at least one halogen in at least one of α- or β- positions of the alkyl, —OZ$_o$ or

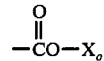

in which Z$_o$ is unsubstituted or substituted alkyl of 1 to 5 carbon atoms or unsubstituted or substituted phenyl, and X$_o$ is hydrogen or a substituent as defined in Z$_o$, Z represents hydrogen or acyl; $m$ and $n$ are individually a value of 0 or 1; $p$ and $q$ are individually a value of 0 or 1, but the sum of $p$ and $q$ is 1 or more, $r$ is an integer of 1 to 5; and $x$, $y$ and $z$ are individually a value of 0, 1 or 2, provided that when A is aromatic hydrocarbon, $x+y+z$ is 1 or 2 and, when A is other than aromatic hydrocarbon, $x+y$ is 1 or 2; and (b) superimposing the receiving element on the photosensitive element at least during said processing step whereby the diffusible dye image is transferred onto the receiving element.

2. A process according to claim 1 wherein A represents a substituted or unsubstituted aromatic hydrocarbon ring which can have at least one substituent selected from alkyl, aromatic hydrocarbon, aryloxy, halogen, nitro, cyano, acylamino, alkylamino, amyl, acyloxy, aralkyl, hydroxyl, amino, carbamoyl, sulfamoyl, and arylamino.

3. A process according to claim 2 wherein Yo represents —$CF_3$.

4. A process according to claim 1 wherein the photosensitive element further comprises a sub-layer adjacent to an emulsion layer, at least one of the emulsion layer and sub-layer containing the dye developer.

5. A process according to claim 4 wherein the processing step is carried out in the presence of an auxiliary developer.